(12) United States Patent
Dai et al.

(10) Patent No.: US 12,261,784 B2
(45) Date of Patent: Mar. 25, 2025

(54) DETERMINING AN RF RETUNING GAP FOR CROSS-BWP UPLINK FREQUENCY HOPPING

(71) Applicant: QUALCOMM Incorporated, San Diego, CA (US)

(72) Inventors: Jing Dai, Beijing (CN); Chao Wei, Beijing (CN); Jing Lei, San Diego, CA (US); Peter Pui Lok Ang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/757,910

(22) PCT Filed: Jan. 19, 2020

(86) PCT No.: PCT/CN2020/072933
§ 371 (c)(1),
(2) Date: Jun. 23, 2022

(87) PCT Pub. No.: WO2021/142818
PCT Pub. Date: Jul. 22, 2021

(65) Prior Publication Data
US 2023/0031875 A1    Feb. 2, 2023

(51) Int. Cl.
*H04L 5/00*    (2006.01)
*H04L 1/08*    (2006.01)
(Continued)

(52) U.S. Cl.
CPC .............. *H04L 5/0012* (2013.01); *H04L 1/08* (2013.01); *H04W 72/1268* (2013.01)

(58) Field of Classification Search
CPC ..... H04L 1/08; H04L 5/0012; H04W 72/1268
See application file for complete search history.

(56) References Cited

U.S. PATENT DOCUMENTS

2016/0226639 A1    8/2016 Xiong et al.
2017/0208590 A1    7/2017 Kim et al.
(Continued)

FOREIGN PATENT DOCUMENTS

CN    102428660 A    4/2012
CN    107409391 A    11/2017
(Continued)

OTHER PUBLICATIONS

Intel Corporation: "On Intra-frequency Measurement with Gap orInterruption," R4-1800138, 3GPP TSG-RAN4 Meeting #AH1801, Jan. 22-26, 2018, Jan. 15, 2018 (Jan. 15, 2018), the whole document, pp. 1-5.

(Continued)

*Primary Examiner* — Alpus Hsu
(74) *Attorney, Agent, or Firm* — Harrity & Harrity, LLP

(57) ABSTRACT

Various aspects of the present disclosure generally relate to wireless communication. In some aspects, a user equipment (UE) may determine a starting symbol of a radio frequency (RF) retuning gap between a first plurality of repetitions of an uplink transmission in a first frequency hop and a second plurality of repetitions of the uplink transmission in a second frequency hop. The starting symbol of the RF retuning gap is based at least in part on a starting symbol of the second plurality of repetitions and a quantity of symbols included in the RF retuning gap. The UE may determine an ending symbol of the RF retuning gap based at least in part on the starting symbol of the second plurality of repetitions. The UE may perform RF retuning during the RF retuning gap. Numerous other aspects are provided.

19 Claims, 16 Drawing Sheets

(51) Int. Cl.
*H04W 72/12* (2023.01)
*H04W 72/1268* (2023.01)

(56) References Cited

U.S. PATENT DOCUMENTS

| | | | | |
|---|---|---|---|---|
| 2018/0035424 A1* | 2/2018 | Sun | .................... | H04W 72/04 |
| 2021/0314084 A1* | 10/2021 | Hwang | ................ | H04L 1/1819 |
| 2021/0352567 A1* | 11/2021 | Kim | .................... | H04W 48/02 |
| 2022/0116850 A1* | 4/2022 | Ahn | .................... | H04W 88/04 |
| 2022/0116881 A1* | 4/2022 | Shin | ................... | H04L 1/1861 |

FOREIGN PATENT DOCUMENTS

| | | |
|---|---|---|
| CN | 108886457 A | 11/2018 |
| WO | WO-2018144209 A1 | 8/2018 |
| WO | 2018203396 A1 | 11/2018 |

OTHER PUBLICATIONS

International Search Report and Written Opinion—PCT/CN2020/072933—ISA/EPO—Oct. 21, 2020.
Intel Corporation: "Layer 1 Enhancements for eURLLC", R1-1810785, 3GPP TSG RAN WG1 Meeting #94b, Intel—EURLLC L1 Enhancements_Final, 3rd Generation Partnership Project (3GPP), Mobile Competence Centre, 650, Route Des Lucioles, F-06921 Sophia-Antipolis Cedex, France, vol. RAN WG1, No Chengdu, China, Oct. 8, 2018-Oct. 12, 2018, Sep. 29, 2018, XP051518190, 12 Pages, PUSCH enhancements, p. 5, paragraph 4—p. 7, The Whole Document.
Supplementary European Search Report—EP20913221—Search Authority—The Hague—Nov. 29, 2022.

\* cited by examiner

DETERMINING AN RF RETUNING GAP FOR CROSS-BWP UPLINK FREQUENCY HOPPING

CROSS-REFERENCE TO RELATED APPLICATION

This application is a 371 national stage of PCT Application No. PCT/CN2020/072933 filed on Jan. 19, 2020, entitled "DETERMINING AN RF RETUNING GAP FOR CROSS-BWP UPLINK FREQUENCY," which is hereby expressly incorporated by reference herein.

FIELD OF THE DISCLOSURE

Aspects of the present disclosure generally relate to wireless communication and to techniques and apparatuses for determining a radio frequency (RF) retuning gap for cross-bandwidth part (BWP) uplink frequency hopping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: determining a starting symbol of a radio frequency (RF) retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap; determining an ending symbol of the RF retuning gap based at least in part on the starting symbol of the second plurality of repetitions; and performing RF retuning during the RF retuning gap.

In some aspects, a UE for wireless communication may include memory and one or more processors coupled to the memory. For example, the one or more processors may be operatively, electronically, communicatively, or otherwise coupled to the memory. The memory may comprise instructions executable (e.g., directly, after compiling, or after conversion, etc.) by the one or more processors to cause the UE to: determine a starting symbol of an RF retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap; determine an ending symbol of the RF retuning gap based at least in part on the starting symbol of the second plurality of repetitions; and perform RF retuning during the RF retuning gap.

In some aspects, a non-transitory computer-readable medium may store one or more instructions for wireless communication. The one or more instructions, when executed by one or more processors of a UE, may cause the UE to: determine a starting symbol of an RF retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap; determine an ending symbol of the RF retuning gap based at least in part on the starting symbol of the second plurality of repetitions; and perform RF retuning during the RF retuning gap.

In some aspects, an apparatus for wireless communication may include means for determining a starting symbol of an RF retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap; means for determining an ending symbol of the RF retuning gap based at least in part on the starting symbol of the second plurality of repetitions; and means for performing RF retuning during the RF retuning gap.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
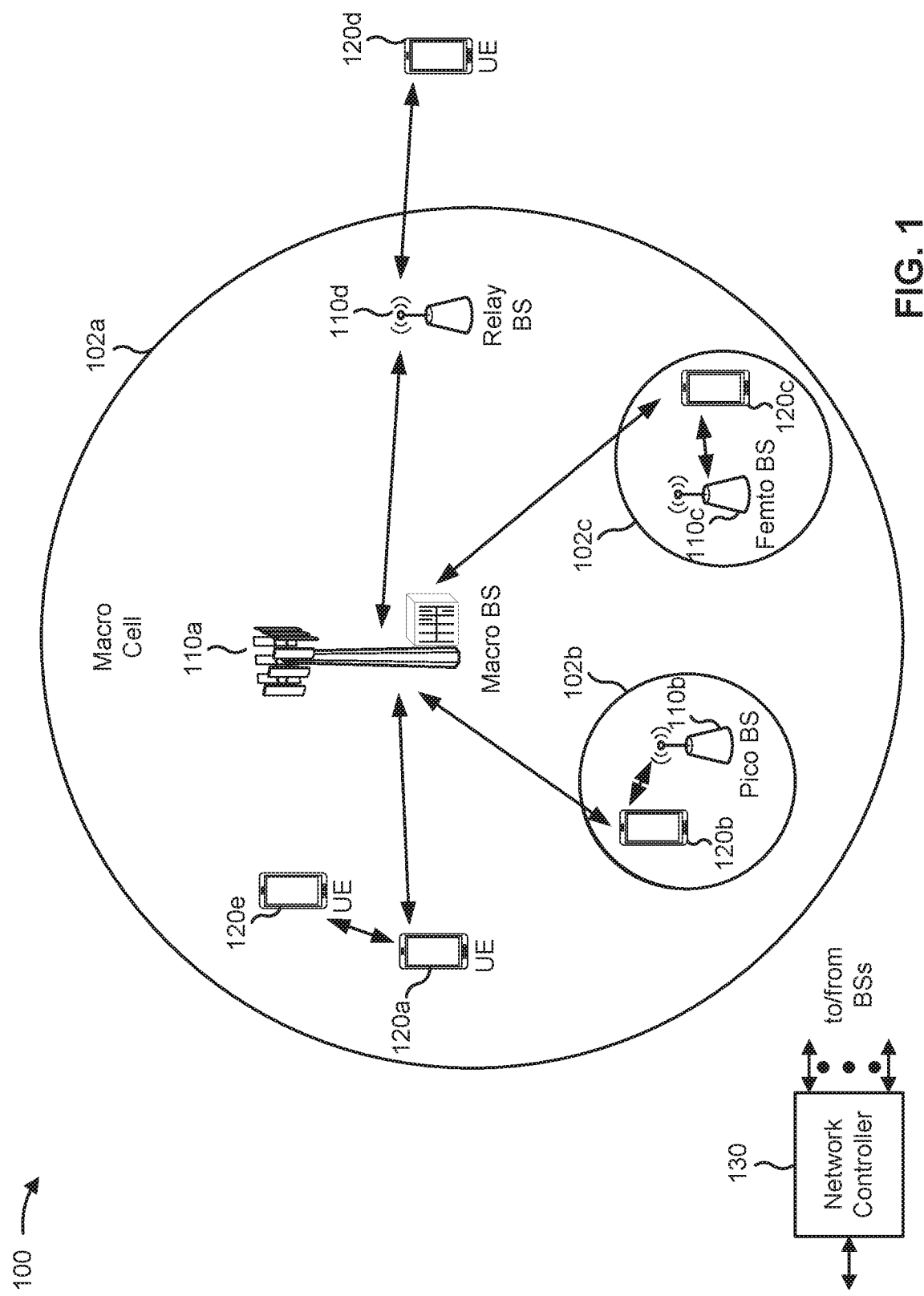
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
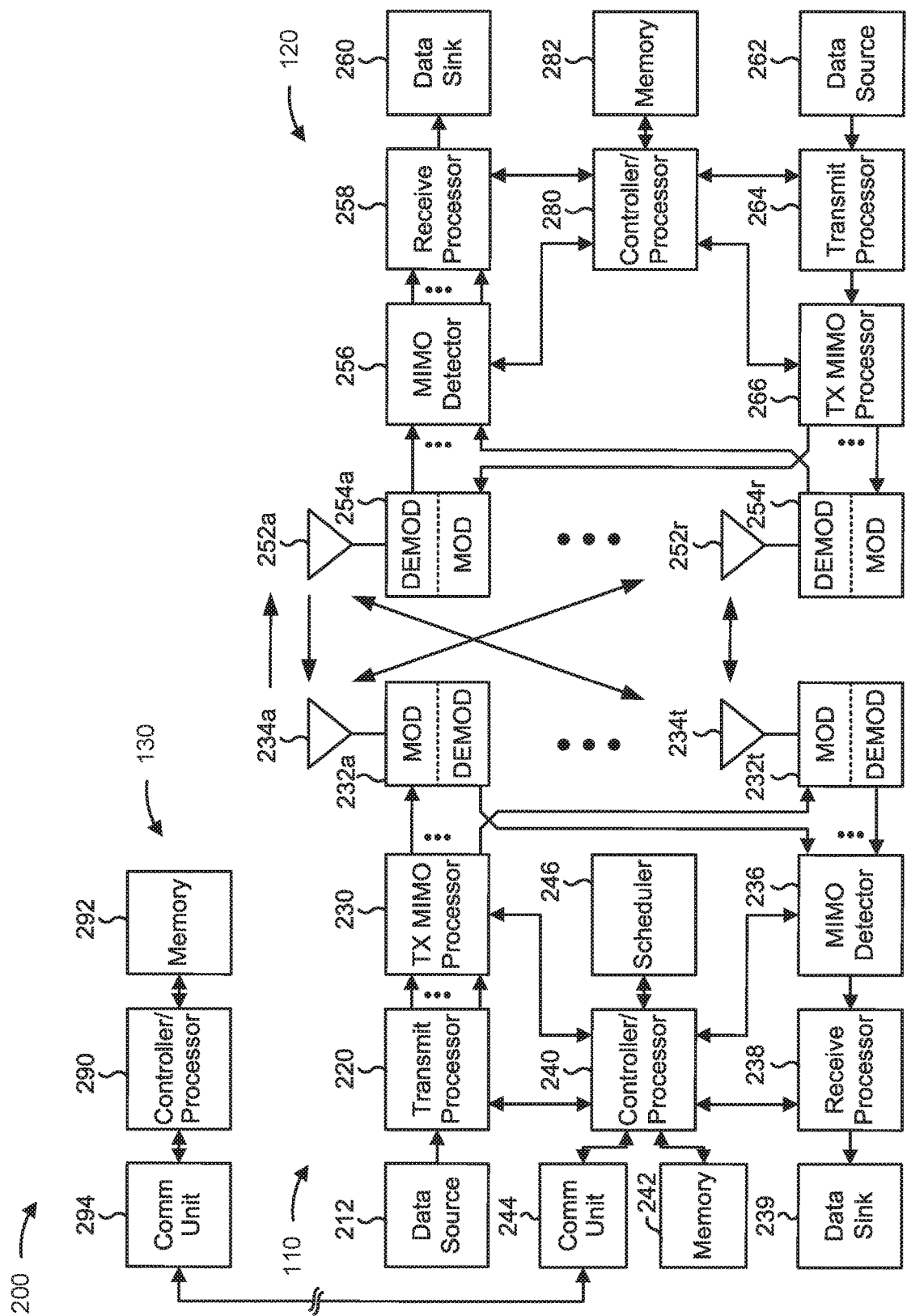
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining a radio frequency (RF) retuning gap for cross-bandwidth part (BWP) uplink frequency hopping, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for determining a starting symbol of an RF retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap, means for determining an ending symbol of the RF retuning gap based at least in part on the starting symbol of the second plurality of repetitions, means for performing RF retuning during the RF retuning gap, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Many devices, such as smart wearable devices, industrial sensors, and video surveillance devices, may use NR-light. NR-light operates within the framework of 5G NR, but with reduced transmission power, reduced bandwidth, reduced computational complexity, longer battery life, and/or a reduced quantity of transmission and reception antennas as compared to NR. For example, an NR-light UE may use a bandwidth of 5 MHz-20 MHz in NR frequency range 1 (FR1, which may include sub-6 GHz operating frequencies) as compared to an NR premium UE that may use a bandwidth of 50 MHz for a 15 kHz subcarrier spacing (SCS) or 100 MHz for a 30/60 kHz SCS. In some aspects, network design is concerned with co-existence of NR premium UEs and NR-light UEs.

An NR-light UE may be a reduced-capability UE. A reduced-capability UE may be a device having reduced or lower capabilities relative to other UEs. For example, a reduced-capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. In some cases, a reduced-capability UE may have reduced capabilities due to a small form factor, due to keeping the cost of the reduced-capability UE low, and/or the like. Examples of reduced-capability UEs may include IoT devices, biometric sensors/devices, smart watches, smart clothing, smart glasses, smart wrist bands, smart jewelry, vehicular components or sensors (e.g., cellular-enabled onboard diagnostic (OBD) devices), smart meters/sensors, and/or the like.

In an NR-light deployment, a UE (e.g., an NR-light UE or reduced-capability UE) may be configured with one or more uplink BWPs (e.g., up to four uplink BWPs) and/or one or more downlink BWPs (e.g., up to four downlink BWPs). A BWP may be a set of contiguous physical resource blocks (PRBs) on a frequency carrier. A BWP permits a UE to transmit or receive with a narrower bandwidth than the entire cell or carrier bandwidth configured for the UE (e.g., configured for an access link on which the UE communicates with a BS). In some cases, the maximum BWP bandwidth (or maximum channel bandwidth) supported by a UE may be based at least in part on a UE capability of the UE. In the case of an NR-light UE, the UE may be capable of supporting only BWPs with small or narrow bandwidths. A narrow bandwidth BWP may permit power savings for the UE to be achieved due to the ability to operate RF baseband components of the UE with a lower sampling rate and reduced baseband processing.

In some cases, one uplink BWP and one downlink BWP may be active at any given time for a UE. In these cases, the UE may not be permitted to transmit uplink transmissions outside of the active uplink BWP. However, if the UE is an NR-light UE, the UE may be unable to perform frequency hopping for uplink transmit diversity in the active uplink BWP if the active uplink BWP is a narrow bandwidth uplink BWP that does not have sufficient bandwidth to support frequency hopping. Frequency hopping refers to a transmission technique where a device transmits repetitions of the same transmission or communication across different frequencies (e.g., one or more first repetitions at a first frequency and one or more second repetitions at a second frequency). The ability to perform frequency hopping for a transmission increases the transmit diversity for the transmission (e.g., because different frequencies may experience different channel conditions), which in turn increases the reliability and performance of the transmission. Thus, if the UE is unable to perform frequency hopping for an uplink transmission, the UE is unable to realize the benefits of uplink transmit diversity for the uplink transmission.

One technique to overcome the narrow bandwidth of an activate uplink BWP for frequency hopping may be referred to as cross-BWP uplink frequency hopping. In this case, the UE is permitted to transmit a first set of repetitions of an uplink transmission in the active uplink BWP, perform RF switching to switch from the active uplink BWP to another uplink BWP configured for the UE, and transmit a second set of repetitions of the uplink transmission in the other uplink BWP. However, some wireless networks (e.g., 5G NR wireless networks) may support many subcarrier spacings (e.g., 15 kHz, 30 kHz, 60 kHz, 120 kHz, 240 kHz, and so on), may support flexible time domain resource allocation (e.g., by allowing a variable quantity of symbols to be allocated to a physical uplink shared channel (PUSCH) transmission, a physical uplink control channel (PUCCH) transmission, and/or the like), and/or may support other parameters that may result in difficulty for the UE in determining the size, the starting symbol, and/or the ending symbol of an RF retuning gap in which the UE is to perform RF retuning between the active uplink BWP and the other uplink BWP. This may result in an increased quantity of punctured symbols due to improper sizing and/or placement of the RF retuning gap, which may result in an increased quantity of dropped uplink transmissions, an increased quantity of undecodable or corrupted uplink transmissions, an increased quantity of retransmissions, and/or the like.

Some aspects described herein provide techniques and apparatuses for determining an RF retuning gap for cross-BWP uplink frequency hopping. In some aspects, a UE (e.g., an NR-light UE or reduced-capability UE) may determine an RF retuning gap between a first plurality of repetitions of an uplink transmission in a first uplink BWP and a second plurality of repetitions of the uplink transmission in a second BWP by determining a starting symbol and an ending symbol for an RF retuning gap of a particular size (e.g., quantity of symbols). The UE may determine the starting gap based at least in part on a starting symbol of the second plurality of repetitions and the quantity of symbols included in the RF retuning gap, and may determine the ending symbol based at least in part on the starting symbol of the second plurality of repetitions.

In this way, the UE is capable of determining an RF retuning gap in scenarios where the UE performs cross-BWP uplink frequency hopping in a wireless communication in which flexible communication parameters may be configured (e.g., flexible subcarrier spacings, flexible time domain resource allocations, and/or the like). This permits the UE to perform RF retuning during the RF retuning gap in a manner that reduces the quantity of punctured symbols due to improper sizing and/or placement of the RF retuning gap, which reduces the quantity of dropped uplink transmissions, reduces the quantity of undecodable or corrupted uplink transmissions, reduces the quantity of retransmissions, and/or the like.

FIGS. 3A-3E are diagrams illustrating one or more examples 300 of determining an RF retuning gap for cross-BWP uplink frequency hopping, in accordance with various aspects of the present disclosure. As shown in FIGS. 3A-3E, example(s) 300 may include a UE (e.g., a UE 120). In some aspects, the UE may be included in a wireless network such as wireless network 100. In some aspects, the UE may communicate with a BS (e.g., a BS 110) in the wireless network via a wireless access link. The wireless access link may include an uplink and a downlink. The UE may perform uplink transmissions on the uplink and may receive downlink transmissions on the downlink.

In some aspects, the wireless network may be a 5G NR wireless network or another type of wireless network that supports partitioning, segmenting, or otherwise dividing the bandwidth of the wireless access link into BWPs. In this case, the UE may be configured with one or more BWPs for the uplink and/or one or more BWPs for the downlink. As shown in FIGS. 3A-3E, in some aspects, the UE may be configured with a plurality of BWPs for the uplink, such as bandwidth part 1 (BWP 1) and bandwidth part 2 (BWP 2). In the example(s) 300 illustrated in FIGS. 3A-3E, BWP 1 may be referred to as the active uplink BWP for the UE, and BWP 2 may be referred to as an inactive uplink BWP, a supplemental uplink BWP, or another uplink BWP.

In some aspects, the UE may be capable of performing uplink frequency hopping across BWP 1 and BWP 2. For example, and as illustrated in FIGS. 3A-3E, the UE may be capable of transmitting one or more first repetitions (e.g., repetition 1 through repetition X) of an uplink transmission in a first frequency hop (frequency hop 1) and one or more second repetitions (e.g., repetition 1 through repetition Y) of the uplink transmission in a second frequency hop (frequency hop 2). In this case, the UE may transmit one repetition per slot, may transmit multiple repetitions per slot, may transmit a portion of a repetition in a slot, may transmit a repetition across a plurality of slots, and/or the like.

Figure 3A:
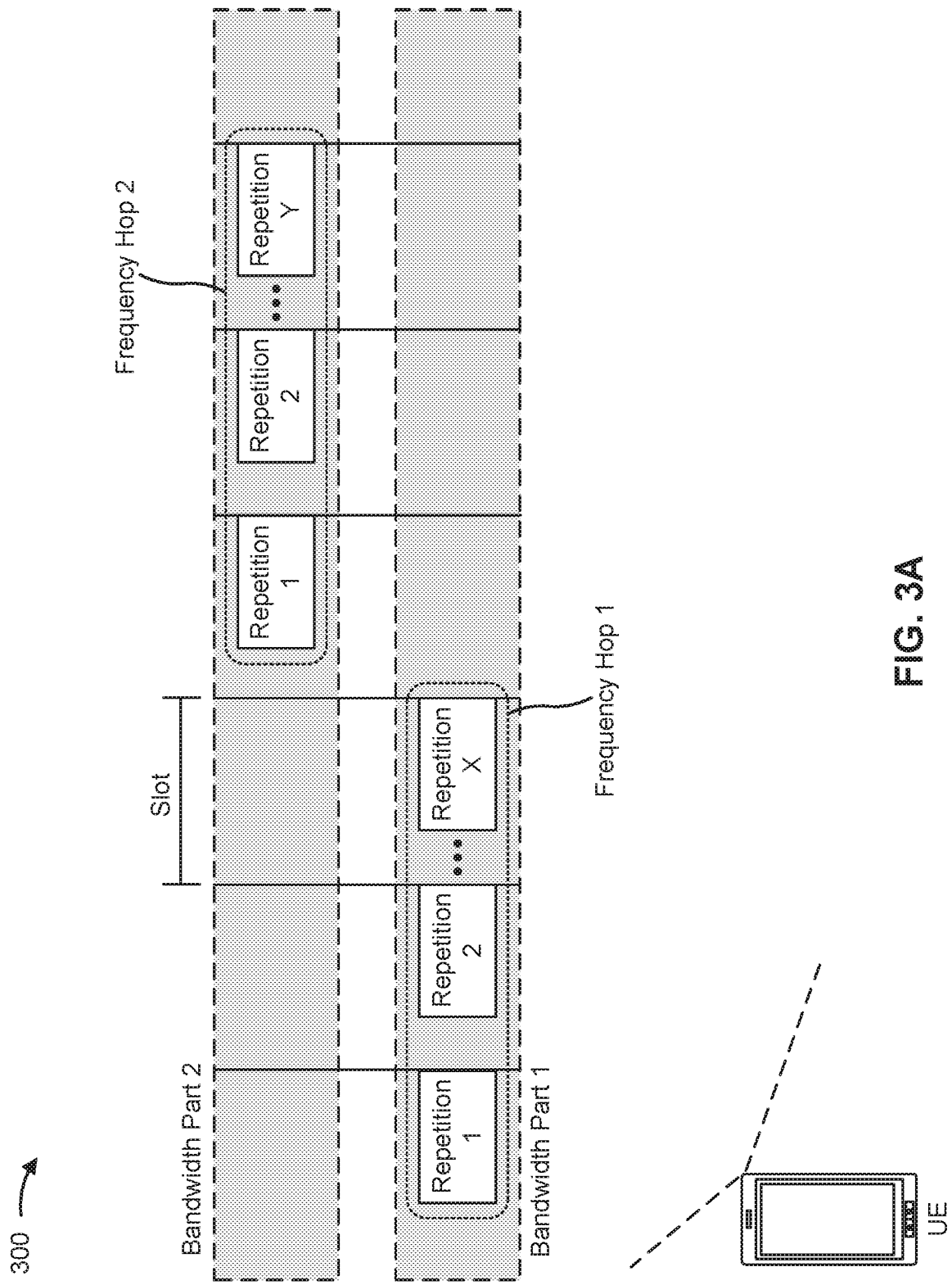
FIGS. 3A-3E, 4A and 4B, 5A and 5B, 6A and 6B, and 7A and 7B are diagrams illustrating examples of determining a radio frequency (RF) retuning gap for cross-bandwidth part (BWP) uplink frequency hopping, in accordance with various aspects of the present disclosure.
Figure 3B:
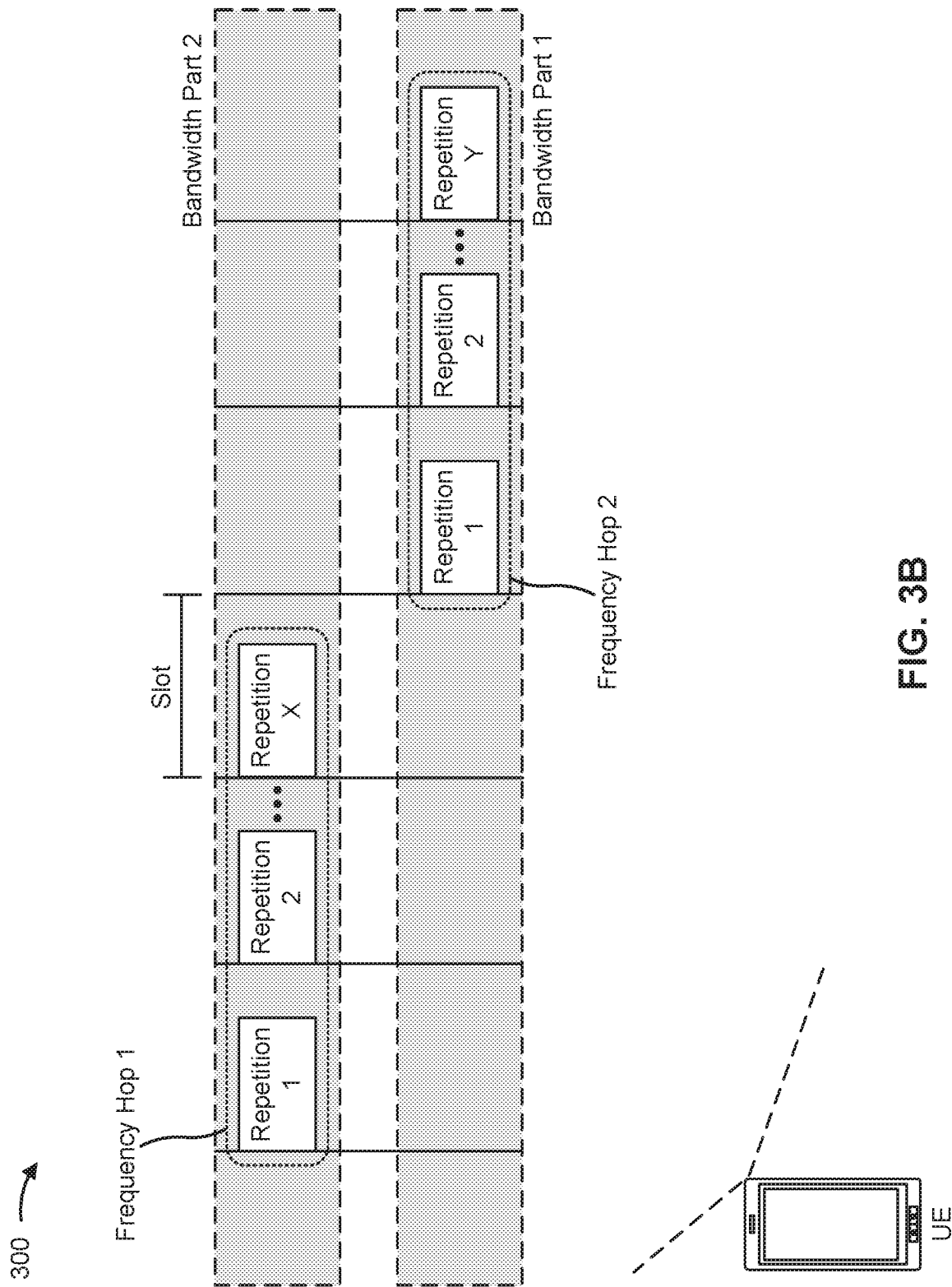

In some aspects, the UE may be configured (e.g., via signaling from a BS, via hardware and/or software configuration, and/or the like) to perform various uplink frequency hopping patterns. For example, FIG. 3A illustrates an example uplink frequency hopping pattern in which the UE is configured to transmit the one or more first repetitions of frequency hop 1 in BWP 1 (e.g., the active uplink BWP of the UE) and to subsequently transmit the one or more second repetitions of frequency hop 2 in BWP 2 (e.g., outside of the active uplink BWP of the UE and in an inactive or supplemental uplink BWP of the UE). As another example, FIG. 3B illustrates an example uplink frequency hopping pattern in which the UE is configured to transmit the one or more first repetitions of frequency hop 1 in BWP 2 (e.g., outside of the active uplink BWP of the UE and in an inactive or supplemental uplink BWP of the UE) and to subsequently transmit the one or more second repetitions of frequency hop 2 in BWP 1 (e.g., the active uplink BWP of the UE).

Moreover, the UE may be capable of performing RF retuning prior to frequency hop 1, between frequency hop 1 and frequency hop 2, and/or after frequency hop 2. Accordingly, the UE may be capable of retuning one or more RF components of the UE (e.g., one or more antennas 252, one or more MODs 254, one or more Tx MIMO processors 266, one or more transmit processors 264, one or more transmit RF chain components, and/or the like) from the frequency of BWP 1 to the frequency of BWP 2, and/or from the frequency of BWP 2 to the frequency of BWP 1. In some aspects, the amount of time that the UE takes to perform RF retuning may be based at least in part on the UE capability of the UE to retune the one or more RF components of the UE.

To accommodate for RF retuning, the UE may determine an RF retuning gap in which the UE is to perform RF retuning. The size or time duration of the RF retuning gap may be configured or determined such that the RF retuning gap is sufficiently long to permit the UE to perform RF retuning during the RF retuning gap. In this case, the size or time duration of the RF retuning gap may be based at least in part on the UE capability of the UE to retune the one or more RF components of the UE.

Figure 3C:
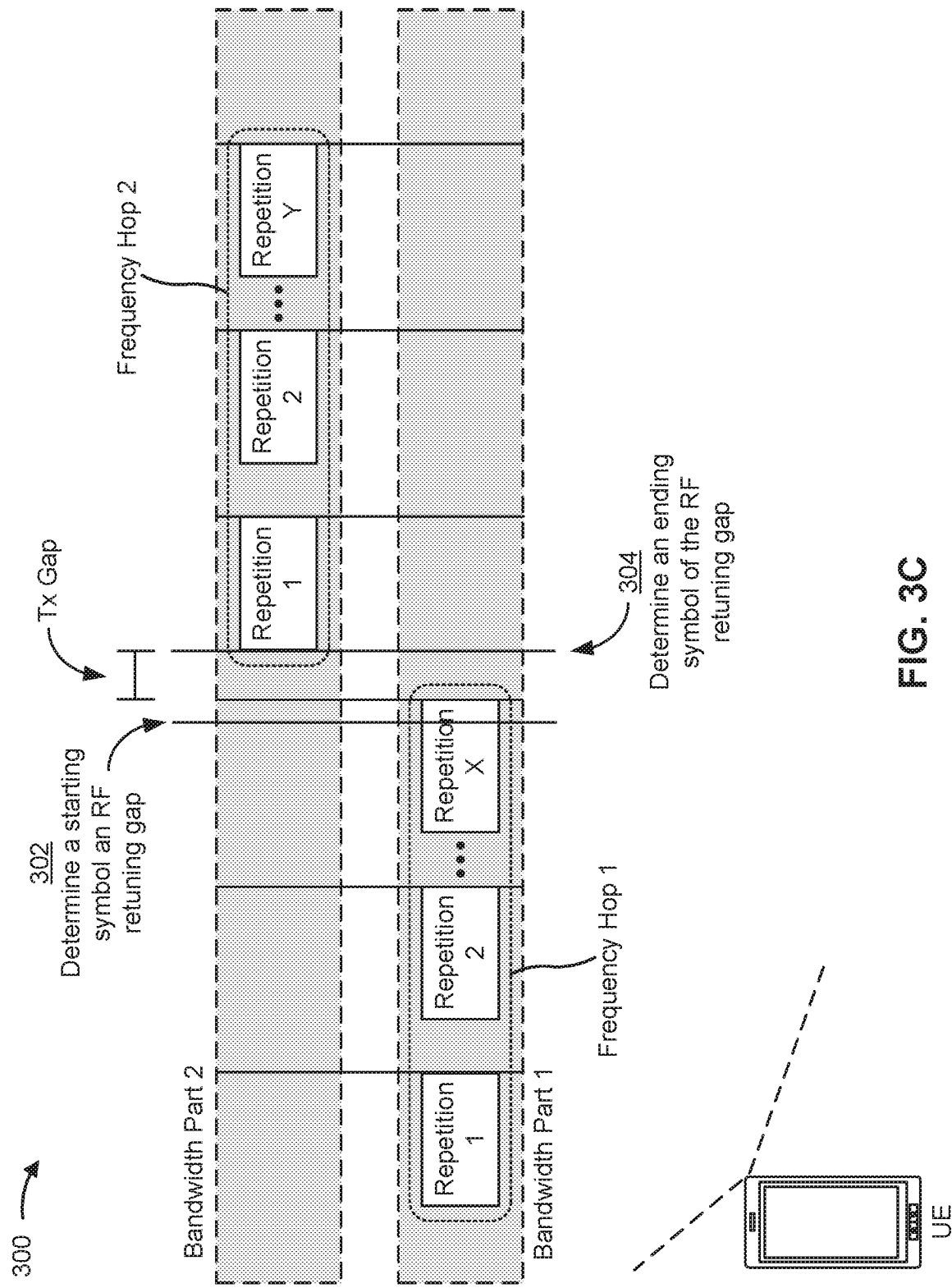
Figure 3D:
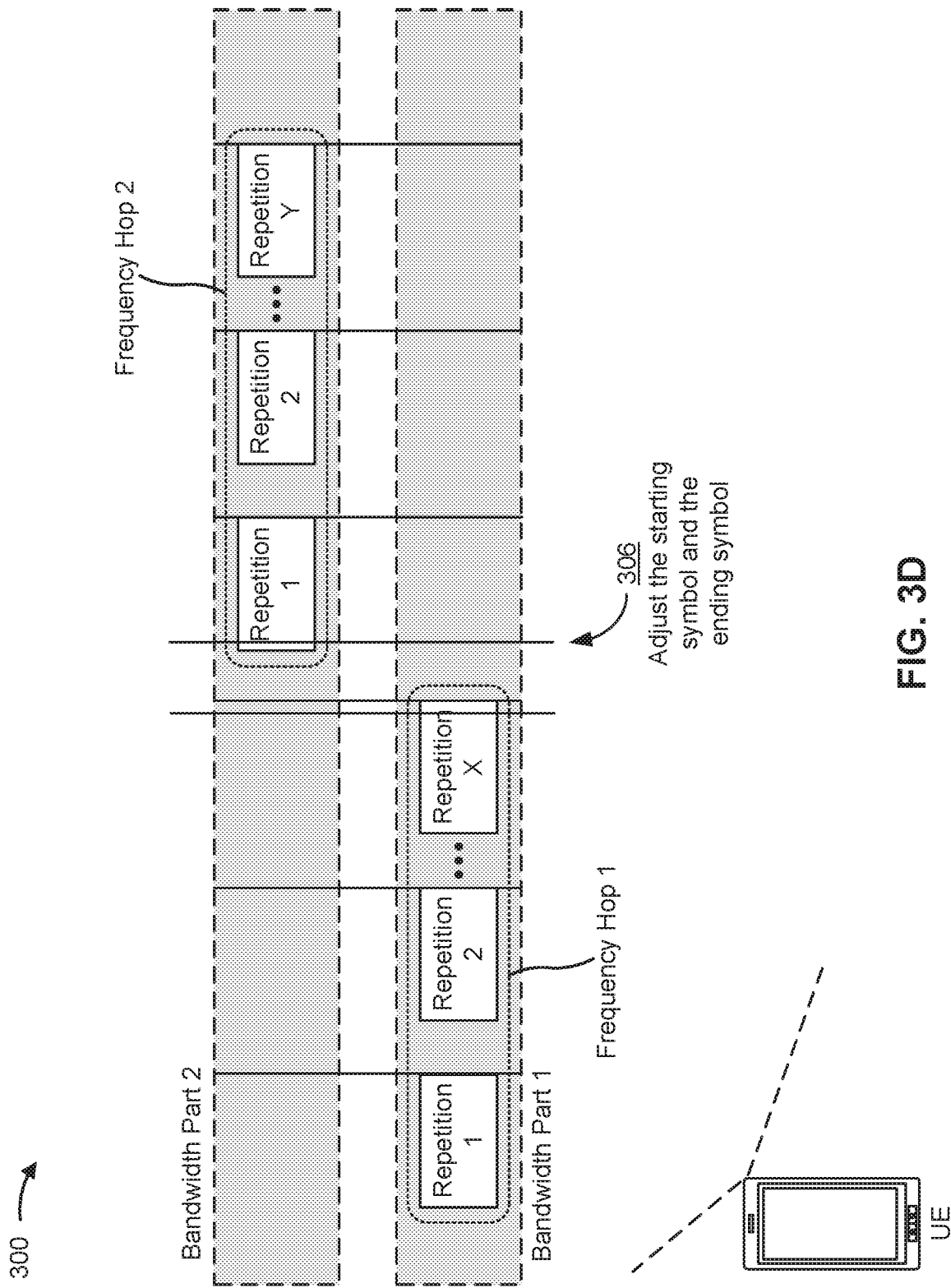
Figure 3E:
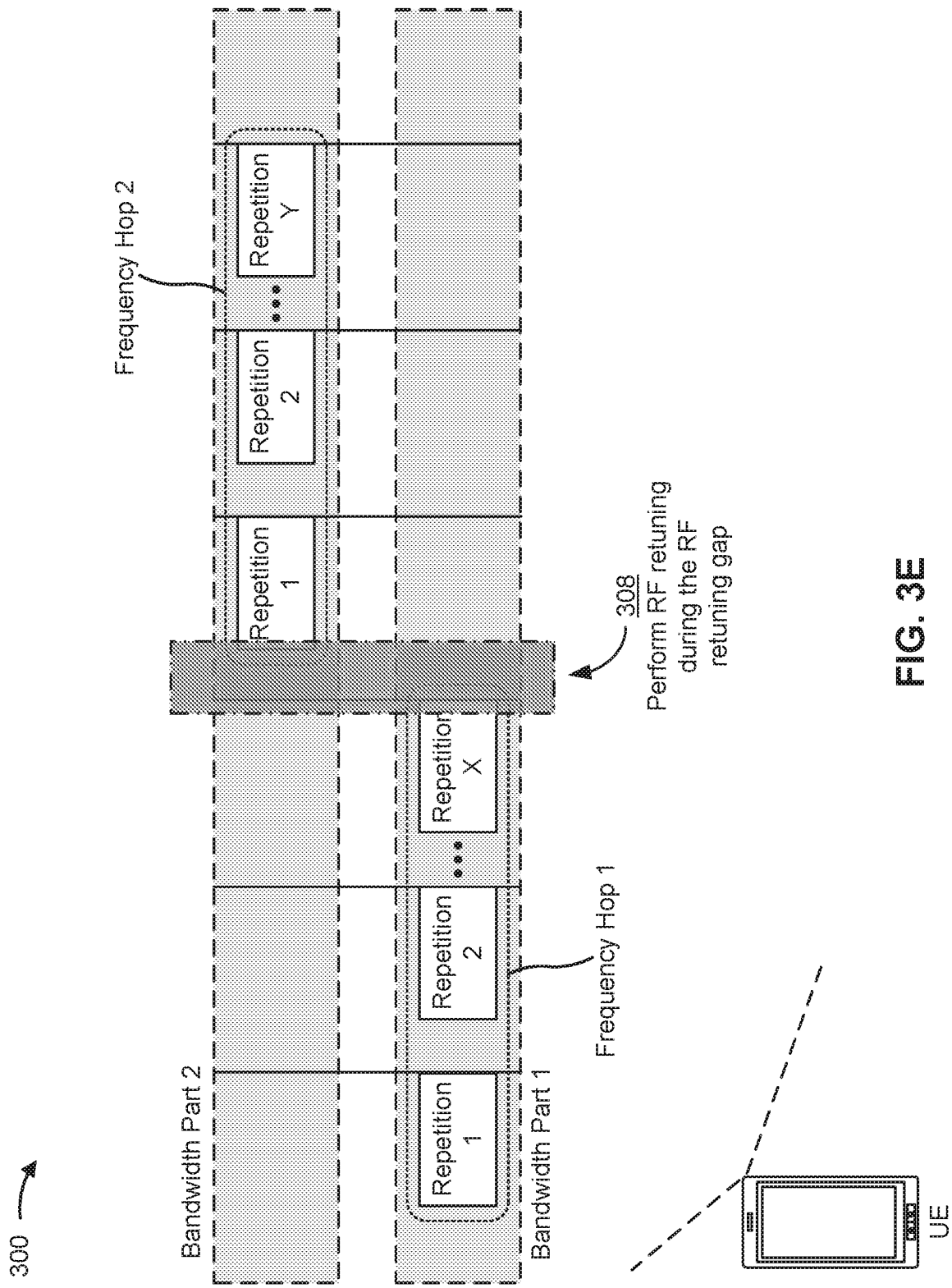

FIGS. 3C-3E illustrate one or more examples of determining an RF retuning gap during a transmit gap (Tx gap) between the one or more first repetitions of frequency hop 1 and the one or more second repetitions of frequency hop 2. While FIGS. 3C-3E illustrate one or more examples in the context of an uplink frequency hopping pattern in which the UE is configured to transmit the one or more first repetitions of frequency hop 1 in BWP 1 (e.g., the active uplink BWP of the UE) and to subsequently transmit the one or more second repetitions of frequency hop 2 in BWP 2 (e.g., outside of the active uplink BWP of the UE and in an inactive or supplemental uplink BWP of the UE), the one or more examples described in connection with FIGS. 3C-3E may be applied in the context of an uplink frequency hopping pattern in which the UE is configured to transmit the one or more first repetitions of frequency hop 1 in BWP 2 (e.g., outside of the active uplink BWP of the UE and in an inactive or supplemental uplink BWP of the UE) and to subsequently transmit the one or more second repetitions of frequency hop 2 in BWP 1 (e.g., the active uplink BWP of the UE).

As shown in FIG. 3C, and by reference number 302, the UE may determine a starting symbol of the RF retuning gap. In some aspects, the UE may determine the starting symbol of the RF retuning gap based at least in part on a starting symbol of the one or more second repetitions (e.g., the starting symbol of repetition 1 of the one or more second repetitions) and a quantity of symbols included in the RF retuning gap (e.g., the size of the RF retuning gap). For example, the UE may determine the starting symbol as $n_{2ndHopStart}-N_{retuning}$, where $n_{2ndHopStart}$ is the first symbol of frequency hop 2 (e.g., the starting symbol of repetition 1 in frequency hop 2) and $N_{retuning}$ is the quantity of symbols included in the RF retuning gap.

As further shown in FIG. 3C, and by reference number 304, the UE may determine an ending symbol of the RF retuning gap. In some aspects, the UE may determine the ending symbol of the RF retuning gap based at least in part on the starting symbol of the one or more second repetitions of frequency hop 2 (e.g., the starting symbol of repetition 1 of the one or more second repetitions). For example, the UE may determine the ending symbol as $n_{2ndHopStart}-1$. Accordingly, the ending symbol of the RF retuning gap may be the adjacent symbol prior to the starting symbol of repetition 1 of the one or more second repetitions.

In some cases, due to the size or duration of the RF retuning gap, the starting symbol of the RF retuning gap may occur during a repetition of the one or more first repetitions in frequency hop 1. As an example, and as illustrated in FIG. 3C, the starting symbol of the RF retuning gap may occur during repetition X. The UE may determine that the starting symbol of the RF retuning gap may occur during a repetition of the one or more first repetitions in frequency hop 1 based at least in part on determining that the size or duration of the RF retuning gap is greater than the size or duration of the transmission gap between frequency hop 1 and frequency hop 2 (e.g., $N_{retuning}N_{txgap}$, where $N_{txgap}$ is the quantity of symbols included in the transmission gap).

In this case, the UE may determine that the RF retuning gap at least partially overlaps at least a subset of the one or more first repetitions. Accordingly, the UE may puncture or refrain from transmitting the symbols of at least the subset of the one or more first repetitions that overlap with the RF retuning gap. The symbols of at least the subset of the one or more first repetitions that overlap with the RF retuning gap may be referred to as $\Delta_{puncture}$. The UE may determine $\Delta_{puncture}$ as $\Delta_{puncture}=N_{retuning}-N_{txgap}$. The $\Delta_{puncture}$ may be located in slot $k_{hop}-1$, where $k_{hop}$ may refer to the first slot of frequency hop 2 (e.g., the slot in which repetition 1 of the one or more second repetitions is transmitted).

As shown in FIG. 3D, and by reference number 306, in some aspects, the UE may adjust the starting symbol and the ending symbol of the RF retuning gap. For example, the UE may determine to adjust the starting symbol and the ending symbol of the RF retuning gap in cases where the starting symbol and the ending symbol may result in particular types of uplink transmissions being punctured or dropped in repetitions from frequency hop 1 that overlap with the RF retuning gap. In this case, the UE may determine to adjust the starting symbol and the ending symbol of the RF retuning gap based at least in part on determining that one or more symbols carrying a demodulation reference signal (DMRS) in frequency hop 1 overlap with the RF retuning gap. The UE may adjust the starting symbol and the ending symbol of the RF retuning gap by moving the starting symbol and the ending symbol forward in time such that the RF retuning gap starts to at least partially overlap with repetition 1 of frequency hop 2. The UE may continue to move the starting symbol and the ending symbol forward in time until the one or more symbols carrying a DMRS in frequency hop 1 do not overlap with the RF retuning gap.

To adjust the starting symbol and the ending symbol of the RF retuning gap, the UE may determine $\Delta_{puncture}$ as $\Delta_{puncture}=\Delta_1+\Delta_2$, where $\Delta_1$ is the quantity of symbols to be punctured or dropped from frequency hop 1 and $\Delta_2$ is the quantity of symbols to be punctured or dropped from frequency hop 2. The UE may initialize $\Delta_1$ as $\Delta_1=\Delta_{puncture}$, and may initialize $\Delta_2$ as $\Delta_2=0$. If the UE determines that the value of $\Delta_1$ results in symbols in frequency hop 1 carrying particular types of uplink transmissions (e.g., DMRSs) overlapping with the RF retuning gap, the UE may adjust the values of $\Delta_1$ and $\Delta_2$ by $\Delta_1=\Delta_1-1$ and $\Delta_2=\Delta_2+1$, respectively, for m times (m=1, 2, . . . ) until the UE determines a value for m that results in the symbols in frequency hop 1 carrying particular types of uplink transmissions no longer overlapping with the RF retuning gap. Accordingly, the starting symbol of the RF retuning gap and the ending symbol of the RF retuning gap become $n_{2ndHopStart}-N_{retuning}+m$ and $n_{2ndHopStart}-1+m$, respectively.

As shown in FIG. 3E, and by reference number 308, the UE may perform RF retuning during the RF retuning gap (e.g., the unadjusted or adjusted RF retuning gap). For example, the UE may retune one or more RF components of the UE from being tuned to the frequency of BWP 1 to the frequency of BWP 2 during the RF retuning gap. Moreover, if the RF retuning gap overlaps any symbols of repetitions of frequency hop 1 and/or any symbols of repetitions of frequency hop 2, the UE may puncture or refrain from transmitting these symbols during the RF retuning gap.

As indicated above, FIGS. 3A-3E are provided as one or more examples. Other examples may differ from what is described with respect to FIGS. 3A-3E.

Figure 4A:
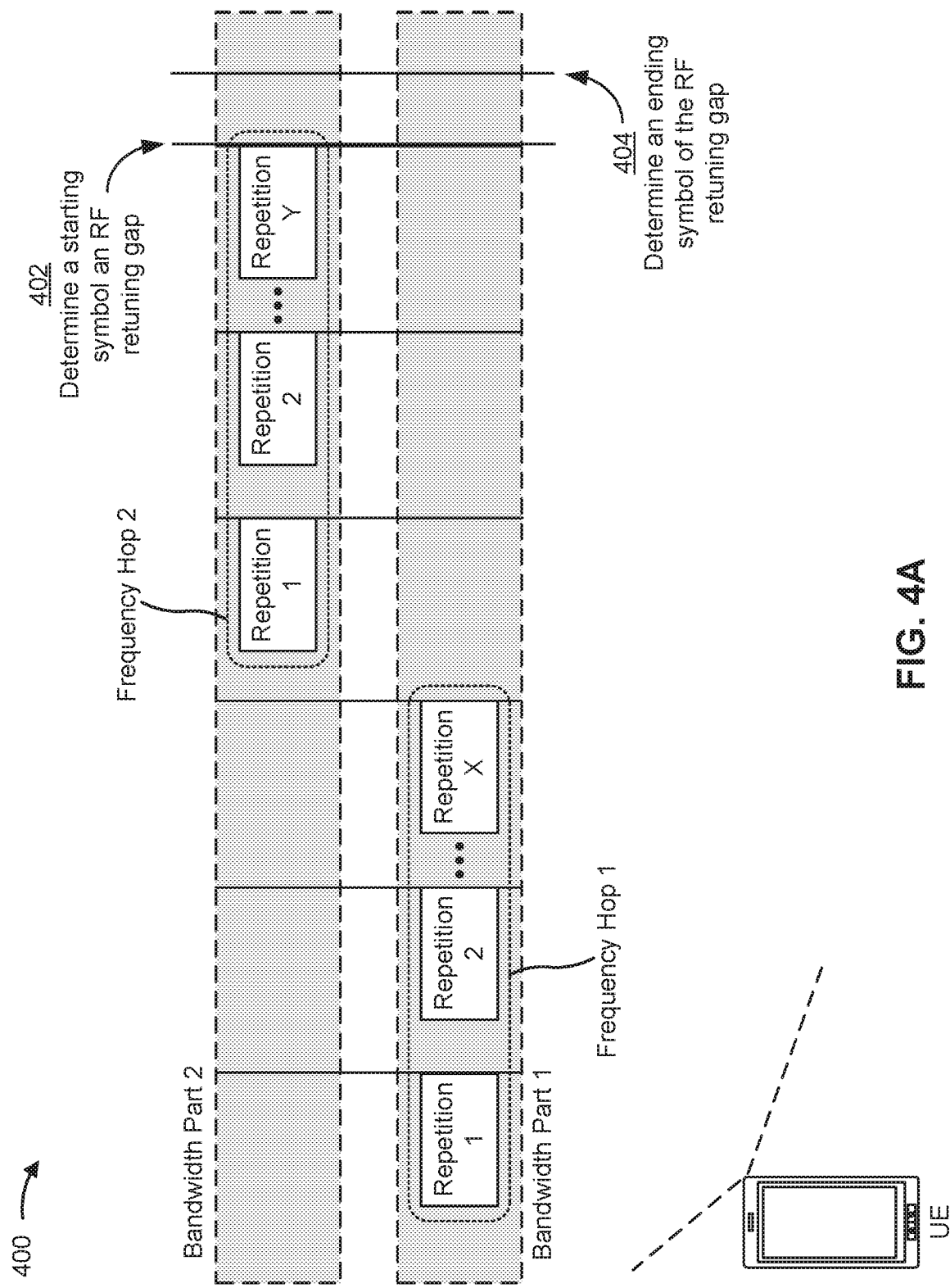
Figure 4B:
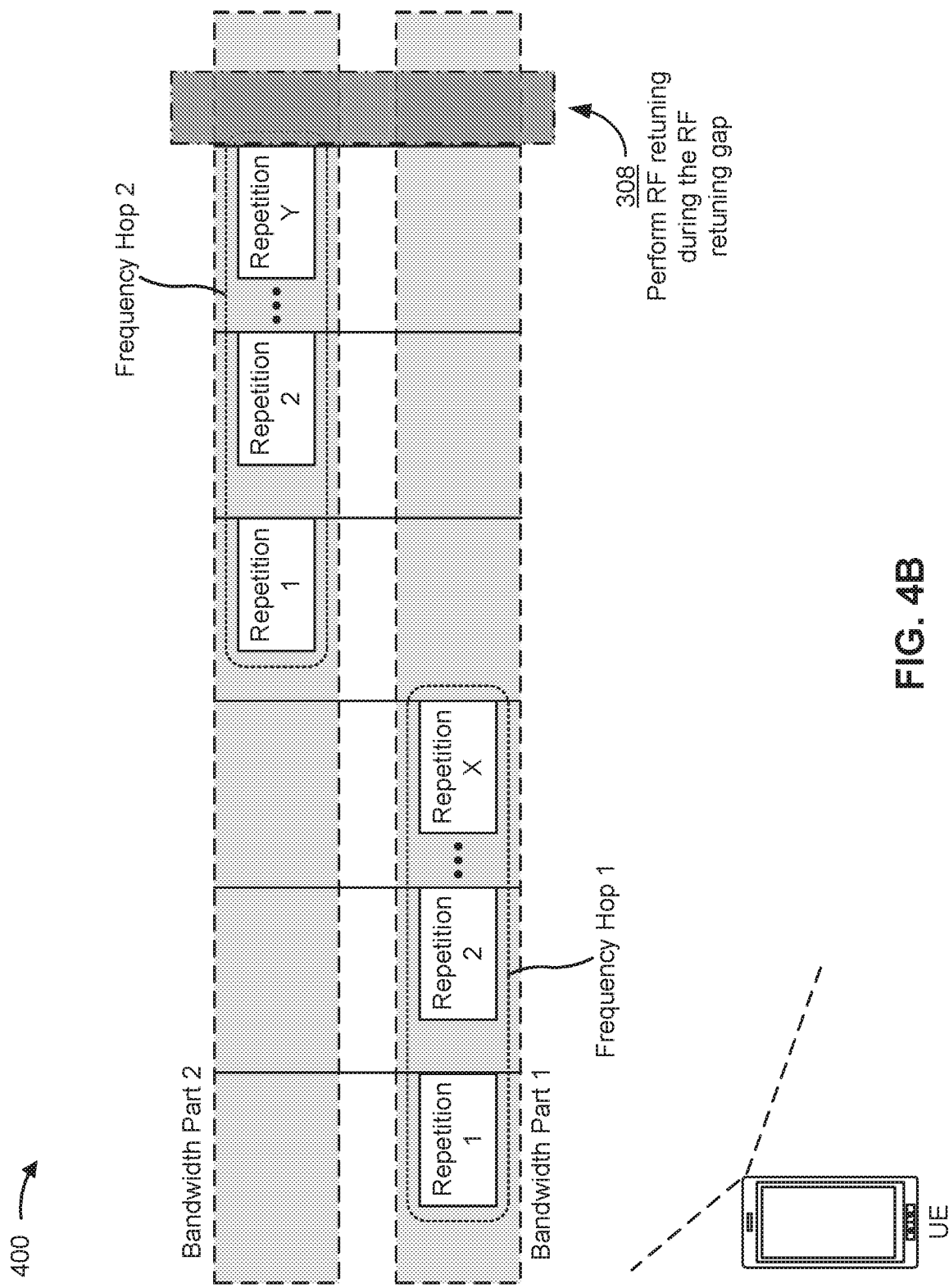

FIGS. 4A and 4B are diagrams illustrating one or more examples 400 of determining an RF retuning gap for cross-BWP uplink frequency hopping, in accordance with various aspects of the present disclosure. As shown in FIGS. 4A and 4B, example(s) 400 may include a UE (e.g., a UE 120). In some aspects, the UE may be included in a wireless network such as wireless network 100. In some aspects, the UE may communicate with a BS (e.g., a BS 110) in the wireless network via a wireless access link. The wireless access link may include an uplink and a downlink. The UE may perform uplink transmissions on the uplink and may receive downlink transmissions on the downlink.

In some aspects, the wireless network may be a 5G NR wireless network or another type of wireless network that supports partitioning, segmenting, or otherwise dividing the bandwidth of the wireless access link into BWPs. In this case, the UE may be configured with one or more BWPs for the uplink and/or one or more BWPs for the downlink. As shown in FIGS. 4A and 4B, in some aspects, the UE may be configured with a plurality of BWPs for the uplink, such as bandwidth part 1 (BWP 1) and bandwidth part 2 (BWP 2). In the example(s) 400 illustrated in FIGS. 4A and 4B, BWP 1 may be referred to as the active uplink BWP for the UE, and BWP 2 may be referred to as an inactive uplink BWP, a supplemental uplink BWP, or another uplink BWP.

In some aspects, the UE may be capable of performing uplink frequency hopping across BWP 1 and BWP 2. For example, and as illustrated in FIGS. 4A and 4B, the UE may be capable of transmitting one or more first repetitions (e.g., repetition 1 through repetition X) of an uplink transmission in a first frequency hop (frequency hop 1) and one or more second repetitions (e.g., repetition 1 through repetition Y) of the uplink transmission in a second frequency hop (frequency hop 2). In this case, the UE may transmit one repetition per slot, may transmit multiple repetitions per slot, may transmit a portion of a repetition in a slot, may transmit a repetition across a plurality of slots, and/or the like.

In some aspects, the UE may be configured (e.g., via signaling from a BS, via hardware and/or software configuration, and/or the like) to perform various uplink frequency hopping patterns. For example, example(s) 400 include an example uplink frequency hopping pattern in which the UE is configured to transmit the one or more first repetitions of frequency hop 1 in BWP 1 (e.g., the active uplink BWP of the UE) and to subsequently transmit the one or more second repetitions of frequency hop 2 in BWP 2 (e.g., outside of the active uplink BWP of the UE and in an inactive or supplemental uplink BWP of the UE).

In some aspects, the UE may be capable of performing RF retuning after frequency hop 2, as described in connection with FIGS. 4A and 4B. In some aspects, the UE may additionally perform RF retuning between frequency hop 1 and frequency hop 2, as described above in connection with FIGS. 3A-3E. Accordingly, the UE may be capable of retuning one or more RF components of the UE (e.g., one or more antennas 252, one or more MODs 254, one or more Tx MIMO processors 266, one or more transmit processors 264, one or more transmit RF chain components, and/or the like) from the frequency of BWP 1 to the frequency of BWP 2, and/or from the frequency of BWP 2 to the frequency of BWP 1.

To accommodate for RF retuning, the UE may determine an RF retuning gap in which the UE is to perform RF retuning. The size or time duration of the RF retuning gap may be configured or determined such that the RF retuning gap is sufficiently long to permit the UE to perform RF retuning during the RF retuning gap. In this case, the size or time duration of the RF retuning gap may be based at least in part on the UE capability of the UE to retune the one or more RF components of the UE.

As shown in FIG. 4A, and by reference number 402, the UE may determine a starting symbol of the RF retuning gap after frequency hop 2. In some aspects, the UE may determine the starting symbol of the RF retuning gap based at least in part on an ending symbol of the one or more second repetitions (e.g., the ending symbol of repetition Y of the one or more second repetitions). For example, the UE may determine the starting symbol as $n_{end}+1$, where $n_{end}$ is the ending symbol of the one or more second repetitions of frequency hop 2 (e.g., the ending symbol of repetition Y). Accordingly, the starting symbol of the RF retuning gap may be the adjacent symbol after the ending symbol of repetition Y.

As further shown in FIG. 4A, and by reference number 404, the UE may determine an ending symbol of the RF retuning gap. In some aspects, the UE may determine the ending symbol of the RF retuning gap based at least in part on the ending symbol of the one or more second repetitions (e.g., the ending symbol of repetition Y) and a quantity of symbols included in the RF retuning gap (e.g., the size of the RF retuning gap). For example, the UE may determine the ending symbol as $n_{end}+N_{retuning}$, where $N_{retuning}$ is the quantity of symbols included in the RF retuning gap.

In some aspects, the UE may limit the RF retuning gap to the slot in which the last repetition of the one or more second repetitions (e.g., repetition Y) is to be transmitted. In this case, the RF retuning gap is to be contained within this slot, and the UE may determine the ending slot of the RF retuning gap as the last symbol in the slot and the starting symbol of the RF retuning gap as the quantity of symbols included in the RF retuning gap back from the last symbol. In some cases, limiting the RF retuning gap to the slot in which the last repetition of the one or more second repetitions is to be transmitted may result in one or more symbols of the last repetition being punctured or dropped. To determine whether one or more symbols of the last repetition are to be punctured or dropped, the UE may determine a quantity of symbols, $N_{remain}$, between the ending symbol of the last repetition and the end of the slot. The UE may determine whether the quantity of symbols between the ending symbol of the last repetition and the end of the slot is less than the quantity of symbols included in the RF retuning gap (e.g., $N_{remain}<N_{retuning}$). If the UE determines that the quantity of symbols between the ending symbol of the last repetition and the end of the slot is less than the quantity of symbols included in the RF retuning gap, the UE may puncture or refrain from transmitting the $N_{retuning}-N_{remain}$ symbols.

As shown in FIG. 4B, and by reference number 406, the UE may perform RF retuning during the RF retuning gap. For example, the UE may retune one or more RF components of the UE from being tuned to the frequency of BWP 2 to the frequency of BWP 1 during the RF retuning gap. Moreover, if the RF retuning gap overlaps any symbols of repetitions of frequency hop 2, the UE may puncture or refrain from transmitting these symbols during the RF retuning gap.

As indicated above, FIGS. 4A and 4B are provided as one or more examples. Other examples may differ from what is described with respect to FIGS. 4A and 4B.

Figure 5A:
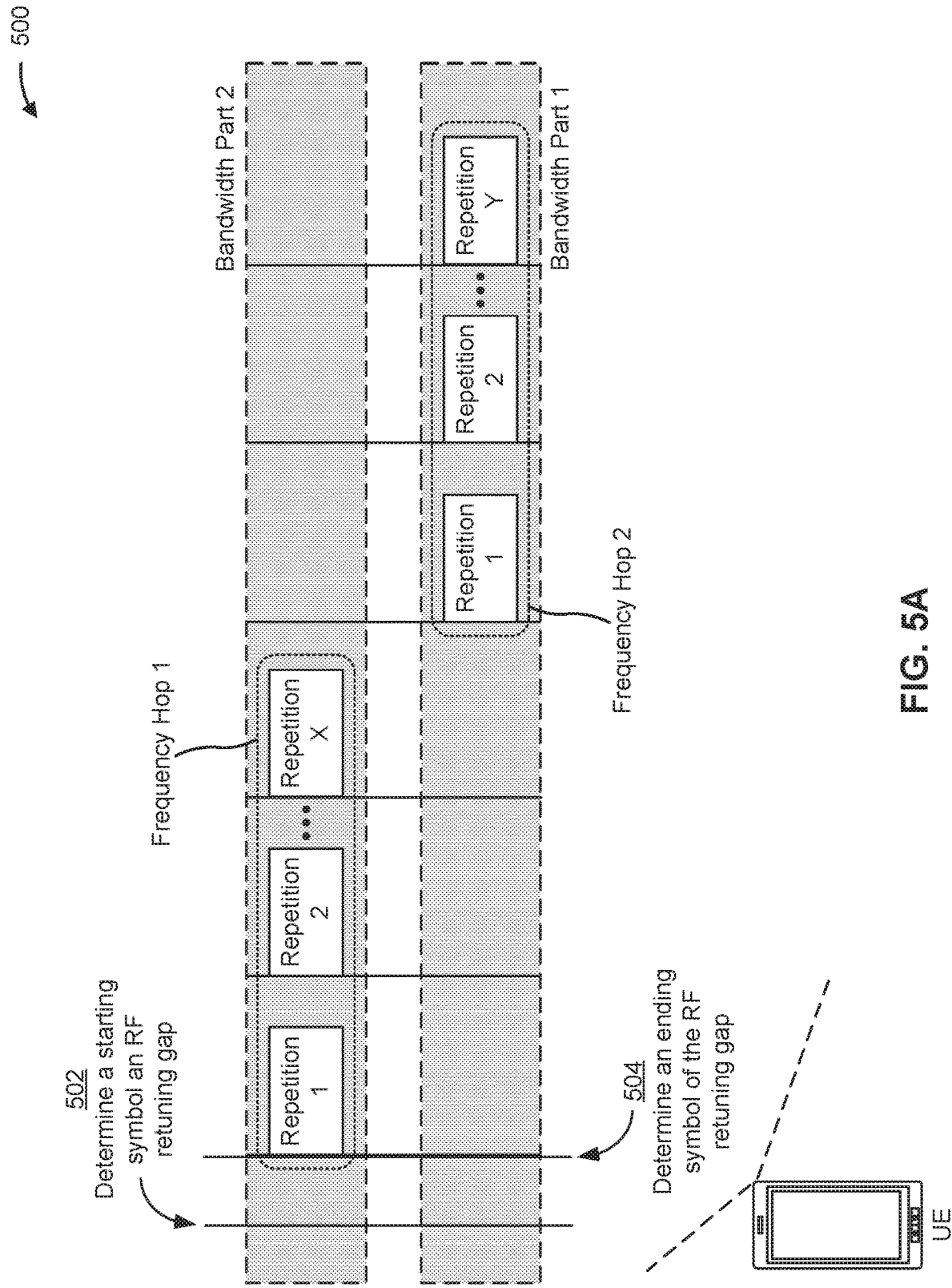
Figure 5B:
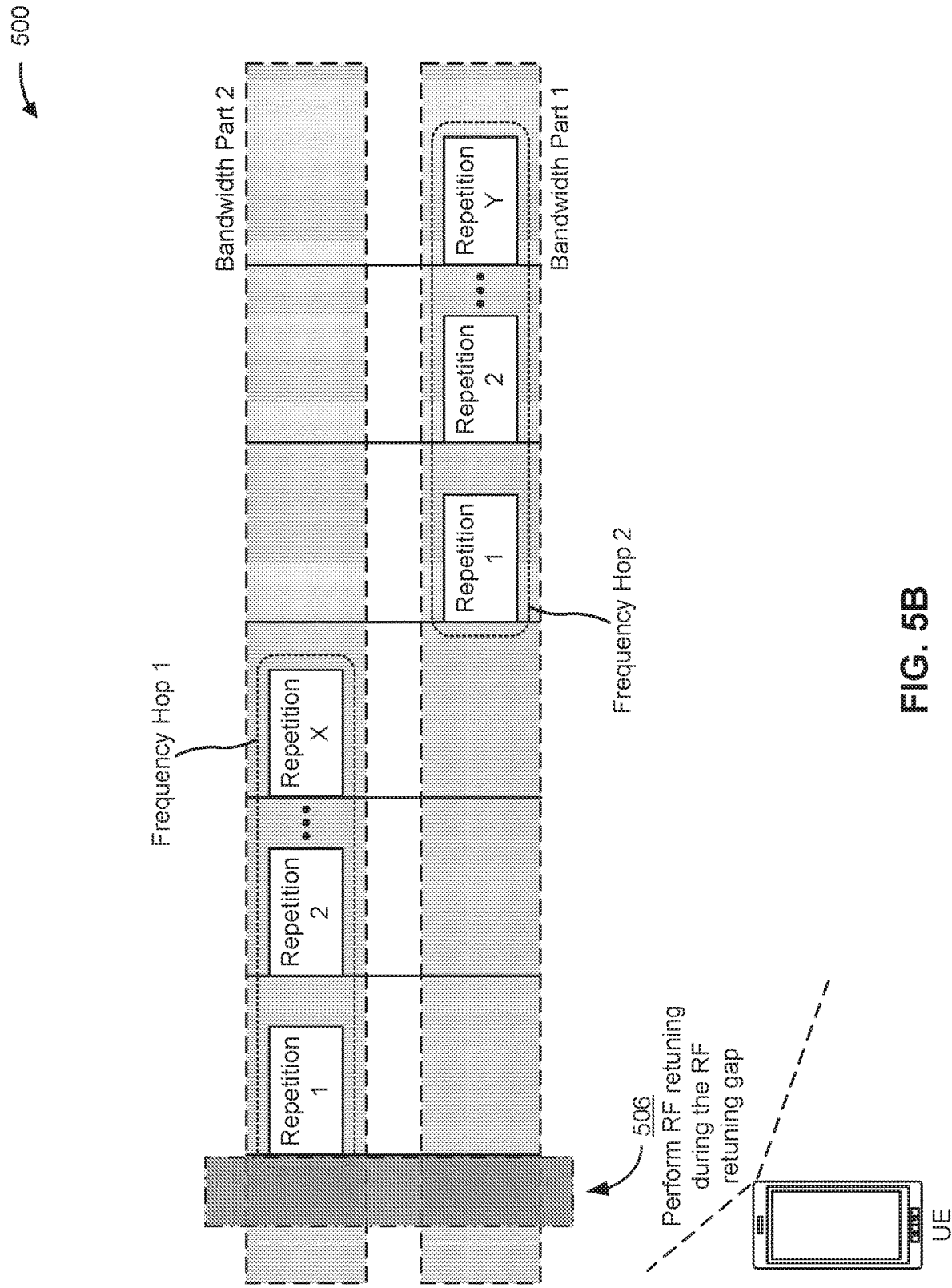

FIGS. 5A and 5B are diagrams illustrating one or more examples 500 of determining an RF retuning gap for cross-BWP uplink frequency hopping, in accordance with various aspects of the present disclosure. As shown in FIGS. 5A and 5B, example(s) 500 may include a UE (e.g., a UE 120). In some aspects, the UE may be included in a wireless network such as wireless network 100. In some aspects, the UE may communicate with a BS (e.g., a BS 110) in the wireless network via a wireless access link. The wireless access link may include an uplink and a downlink. The UE may perform uplink transmissions on the uplink and may receive downlink transmissions on the downlink.

In some aspects, the wireless network may be a 5G NR wireless network or another type of wireless network that supports partitioning, segmenting, or otherwise dividing the bandwidth of the wireless access link into BWPs. In this case, the UE may be configured with one or more BWPs for the uplink and/or one or more BWPs for the downlink. As shown in FIGS. 5A and 5B, in some aspects, the UE may be configured with a plurality of BWPs for the uplink, such as bandwidth part 1 (BWP 1) and bandwidth part 2 (BWP 2). In the example(s) 500 illustrated in FIGS. 5A and 5B, BWP 1 may be referred to as the active uplink BWP for the UE, and BWP 2 may be referred to as an inactive uplink BWP, a supplemental uplink BWP, or another uplink BWP.

In some aspects, the UE may be capable of performing uplink frequency hopping across BWP 1 and BWP 2. For example, and as illustrated in FIGS. 5A and 5B, the UE may be capable of transmitting one or more first repetitions (e.g., repetition 1 through repetition X) of an uplink transmission in a first frequency hop (frequency hop 1) and one or more second repetitions (e.g., repetition 1 through repetition Y) of the uplink transmission in a second frequency hop (frequency hop 2). In this case, the UE may transmit one repetition per slot, may transmit multiple repetitions per slot, may transmit a portion of a repetition in a slot, may transmit a repetition across a plurality of slots, and/or the like.

In some aspects, the UE may be configured (e.g., via signaling from a BS, via hardware and/or software configuration, and/or the like) to perform various uplink frequency hopping patterns. For example, example(s) 500 include an uplink frequency hopping pattern in which the UE is configured to transmit the one or more first repetitions of frequency hop 1 in BWP 2 (e.g., outside of the active uplink BWP of the UE and in an inactive or supplemental uplink BWP of the UE) and to subsequently transmit the one or more second repetitions of frequency hop 2 in BWP 1 (e.g., the active uplink BWP of the UE).

In some aspects, the UE may be capable of performing RF retuning prior to frequency hop 1, as described in connection with FIGS. 5A and 5B. In some aspects, the UE may additionally perform RF retuning between frequency hop 1 and frequency hop 2, as described above in connection with FIGS. 3A-3E. Accordingly, the UE may be capable of retuning one or more RF components of the UE (e.g., one or more antennas 252, one or more MODs 254, one or more Tx MIMO processors 266, one or more transmit processors 264, one or more transmit RF chain components, and/or the like) from the frequency of BWP 1 to the frequency of BWP 2, and/or from the frequency of BWP 2 to the frequency of BWP 1.

To accommodate for RF retuning, the UE may determine an RF retuning gap in which the UE is to perform RF retuning. The size or time duration of the RF retuning gap may be configured or determined such that the RF retuning gap is sufficiently long to permit the UE to perform RF retuning during the RF retuning gap. In this case, the size or time duration of the RF retuning gap may be based at least in part on the UE capability of the UE to retune the one or more RF components of the UE.

As shown in FIG. 5A, and by reference number 502, the UE may determine a starting symbol of the RF retuning gap prior to frequency hop 1. In some aspects, the UE may determine the starting symbol of the RF retuning gap based at least in part on a starting symbol of the one or more first repetitions (e.g., the starting symbol of repetition 1 of the one or more first repetitions) and a quantity of symbols included in the RF retuning gap. For example, the UE may determine the starting symbol as $n_{start} - N_{retuning}$, where $n_{start}$ is the starting symbol of the one or more first repetitions of frequency hop 1 (e.g., the starting symbol of repetition 1) and $N_{retuning}$ is the quantity of symbols included in the RF retuning gap.

As further shown in FIG. 5A, and by reference number 504, the UE may determine an ending symbol of the RF retuning gap. In some aspects, the UE may determine the ending symbol of the RF retuning gap based at least in part on the starting symbol of the one or more first repetitions (e.g., the starting symbol of repetition 1). For example, the UE may determine the ending symbol as $n_{start} - 1$. Accordingly, the starting symbol of the RF retuning gap may be the adjacent symbol prior to the starting symbol of repetition 1 of the one or more first repetitions.

As shown in FIG. 5B, and by reference number 506, the UE may perform RF retuning during the RF retuning gap. For example, the UE may retune one or more RF components of the UE from being tuned to the frequency of BWP 1 to the frequency of BWP 2 during the RF retuning gap.

As indicated above, FIGS. 5A and 5B are provided as one or more examples. Other examples may differ from what is described with respect to FIGS. 5A and 5B.

Figure 6A:
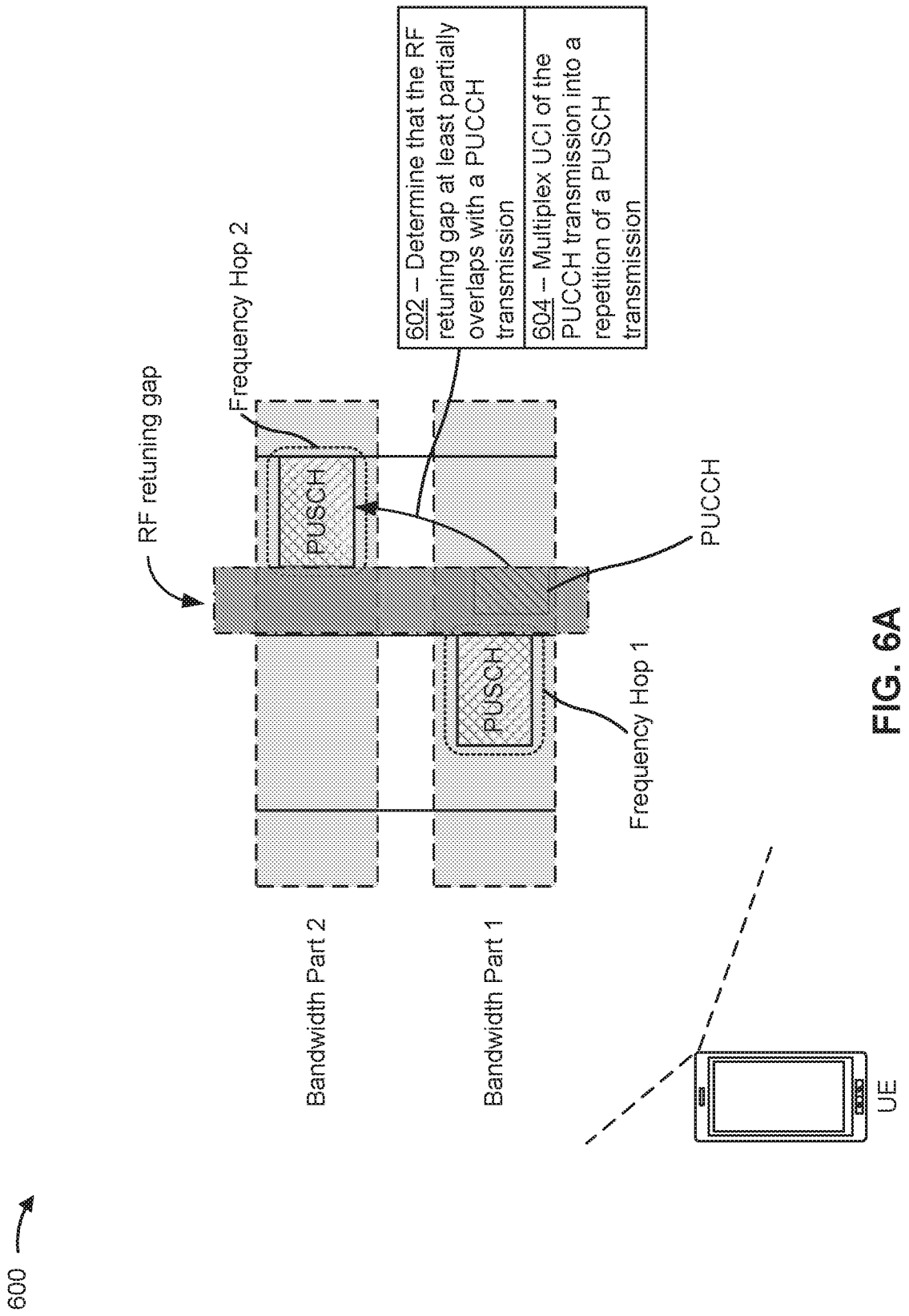
Figure 6B:
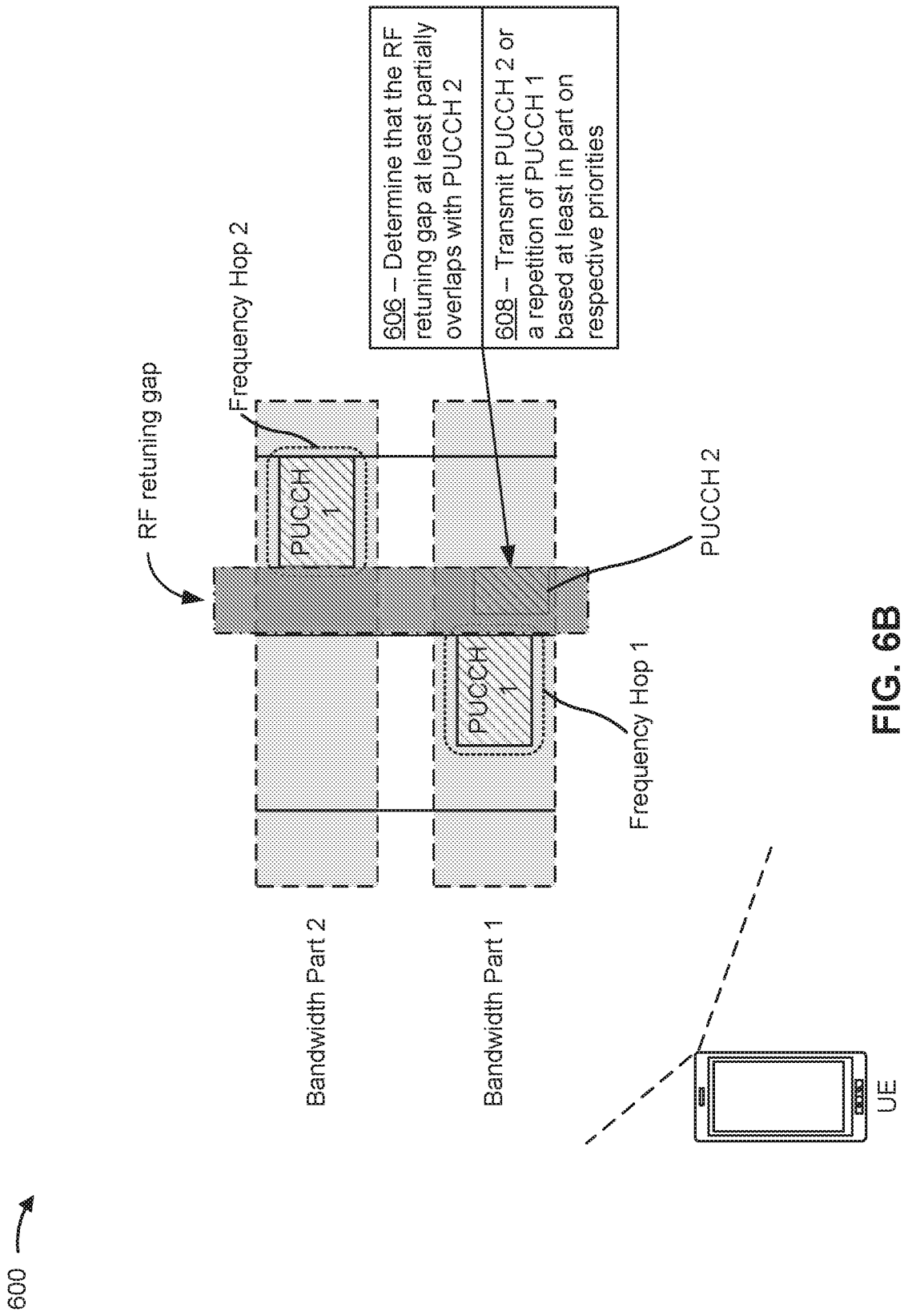

FIGS. 6A and 6B are diagrams illustrating one or more examples 600 of determining an RF retuning gap for cross-BWP uplink frequency hopping, in accordance with various aspects of the present disclosure. As shown in FIGS. 6A and 6B, example(s) 600 may include a UE (e.g., a UE 120). In some aspects, the UE may be included in a wireless network such as wireless network 100. In some aspects, the UE may communicate with a BS (e.g., a BS 110) in the wireless network via a wireless access link. The wireless access link may include an uplink and a downlink. The UE may perform uplink transmissions on the uplink and may receive downlink transmissions on the downlink.

In some aspects, the wireless network may be a 5G NR wireless network or another type of wireless network that supports partitioning, segmenting, or otherwise dividing the bandwidth of the wireless access link into BWPs. In this case, the UE may be configured with one or more BWPs for the uplink and/or one or more BWPs for the downlink. As shown in FIGS. 6A and 6B, in some aspects, the UE may be configured with a plurality of BWPs for the uplink, such as bandwidth part 1 (BWP 1) and bandwidth part 2 (BWP 2). In the example(s) 600 illustrated in FIGS. 6A and 6B, BWP 1 may be referred to as the active uplink BWP for the UE, and BWP 2 may be referred to as an inactive uplink BWP, a supplemental uplink BWP, or another uplink BWP.

In some aspects, the UE may be capable of performing uplink frequency hopping across BWP 1 and BWP 2. For example, the UE may be capable of transmitting one or more first repetitions of a PUSCH transmission in a first frequency hop (frequency hop 1) and one or more second repetitions of the PUSCH transmission in a second frequency hop (frequency hop 2). As another example, the UE may be capable of transmitting one or more first repetitions of a PUCCH transmission in a first frequency hop (frequency hop 1) and one or more second repetitions of the PUCCH transmission in a second frequency hop (frequency hop 2). In this case, the UE may transmit one repetition per slot, may transmit multiple repetitions per slot, may transmit a portion of a repetition in a slot, may transmit a repetition across a plurality of slots, and/or the like.

In some aspects, the UE may be configured (e.g., via signaling from a BS, via hardware and/or software configuration, and/or the like) to perform various uplink frequency hopping patterns. For example, FIGS. 6A and 6B illustrate example uplink frequency hopping patterns in which the UE is configured to transmit the one or more first repetitions of frequency hop 1 in BWP 1 (e.g., the active uplink BWP of the UE) and to subsequently transmit the one or more second repetitions of frequency hop 2 in BWP 2 (e.g., outside of the active uplink BWP of the UE and in an inactive or supplemental uplink BWP of the UE). However, the example(s) 600 illustrated in FIGS. 6A and 6B may be applied in other uplink frequency hopping patterns, such as an uplink frequency hopping pattern in which the UE is configured to transmit the one or more first repetitions of frequency hop 1 in BWP 2 (e.g., outside of the active uplink BWP of the UE and in an inactive or supplemental uplink BWP of the UE) and to subsequently transmit the one or more second repetitions of frequency hop 2 in BWP 1 (e.g., the active uplink BWP of the UE).

Moreover, the UE may be capable of performing RF retuning between frequency hop 1 and frequency hop 2 using one or more techniques described above in connection with FIGS. 3A-3E. Accordingly, the UE may be capable of retuning one or more RF components of the UE (e.g., one or more antennas 252, one or more MODs 254, one or more Tx MIMO processors 266, one or more transmit processors 264, one or more transmit RF chain components, and/or the like) from the frequency of BWP 1 to the frequency of BWP 2, and/or from the frequency of BWP 2 to the frequency of BWP 1. In some aspects, the amount of time that the UE takes to perform RF retuning may be based at least in part on the UE capability of the UE to retune the one or more RF components of the UE.

To accommodate for RF retuning, the UE may determine an RF retuning gap in which the UE is to perform RF retuning. The size or time duration of the RF retuning gap may be configured or determined such that the RF retuning gap is sufficiently long to permit the UE to perform RF retuning during the RF retuning gap. In this case, the size or time duration of the RF retuning gap may be based at least in part on the UE capability of the UE to retune the one or more RF components of the UE.

In some cases, the RF retuning gap may at least partially overlap with other uplink transmissions configured for the UE (e.g., uplink transmissions other than the uplink transmission that is to be transmitted with uplink frequency hopping). Accordingly, the UE may be capable of determining how to process the uplink transmission(s) that at least partially overlap with the RF retuning gap.

As shown in FIG. 6A, and by reference number 602, in some aspects, the UE may determine that an RF retuning gap between one or more first repetitions of a PUSCH transmission and one or more second repetitions of the PUSCH transmission at least partially overlaps with a PUCCH transmission. The PUCCH transmission may carry uplink control information (UCI), such as hybrid automatic repeat request (HARM) feedback, channel state information (CSI) feedback, and/or other types of UCI. In some aspects, the PUCCH transmission may be a single-slot PUCCH transmission that is included in the same slot as a repetition of the PUSCH transmission in frequency hop 2.

As further shown in FIG. 6A, and by reference number 604, the UE may multiplex the UCI of the PUCCH transmission into a repetition of the one or more second repetitions. In this case, the UE may multiplex the UCI of the PUCCH transmission into the repetition that is included in the same slot as the PUCCH transmission. The multiplexing of the UCI of the PUCCH transmission to the repetition of the PUSCH transmission may be referred to as UCI on PUSCH, UCI piggyback, or by other terms.

As shown in FIG. 6B, and by reference number 606, in some aspects, the UE may determine that an RF retuning gap between one or more first repetitions of a first PUCCH transmission (PUCCH 1) and one or more second repetitions of PUCCH 1 at least partially overlaps with another PUCCH transmission (PUCCH 2). PUCCH 1 and PUCCH 2 may each carry UCI.

As further shown in FIG. 6B, and by reference number 608, the UE may transmit either PUCCH 2 or a repetition of PUCCH 1 in the same slot as PUCCH 2, and may drop or refrain from transmitting the other uplink transmission, based at least in part on respective priorities associated with PUCCH 2 and the repetition of PUCCH 1. In some aspects, the respective priorities associated with PUCCH 2 and the repetition of PUCCH 1 may be based at least in part on the type of UCI carried by PUCCH 2 and the repetition of PUCCH 1. For example, HARQ feedback may be the highest priority, a scheduling request (SR) may be the second highest priority, and a CSI report may be the third highest priority. Other UCI type hierarchies may be used. Moreover, if PUCCH 2 and the repetition of PUCCH 1 both include CSI report UCI, different types of CSI reports may be configured in a priority hierarchy. In some aspects, the UE may transmit the PUCCH transmission with the highest priority UCI type and may drop or refrain from transmitting the other PUCCH transmission.

In some aspects, the respective priorities associated with PUCCH 2 and the repetition of PUCCH 1 may be based at least in part on a respective starting slot index of the PUCCH 2 and the repetition of PUCCH 1. In this case, the UE may transmit the PUCCH transmission with the earliest or lowest starting slot index and may drop or refrain from transmitting the other PUCCH transmission. In some aspects, the respective priorities associated with PUCCH 2 and the repetition of PUCCH 1 may be based at least in part on a combination of UCI type, starting slot index, and/or other parameters.

As indicated above, FIGS. 6A and 6B are provided as one or more examples. Other examples may differ from what is described with respect to FIGS. 6A and 6B.

Figure 7A:
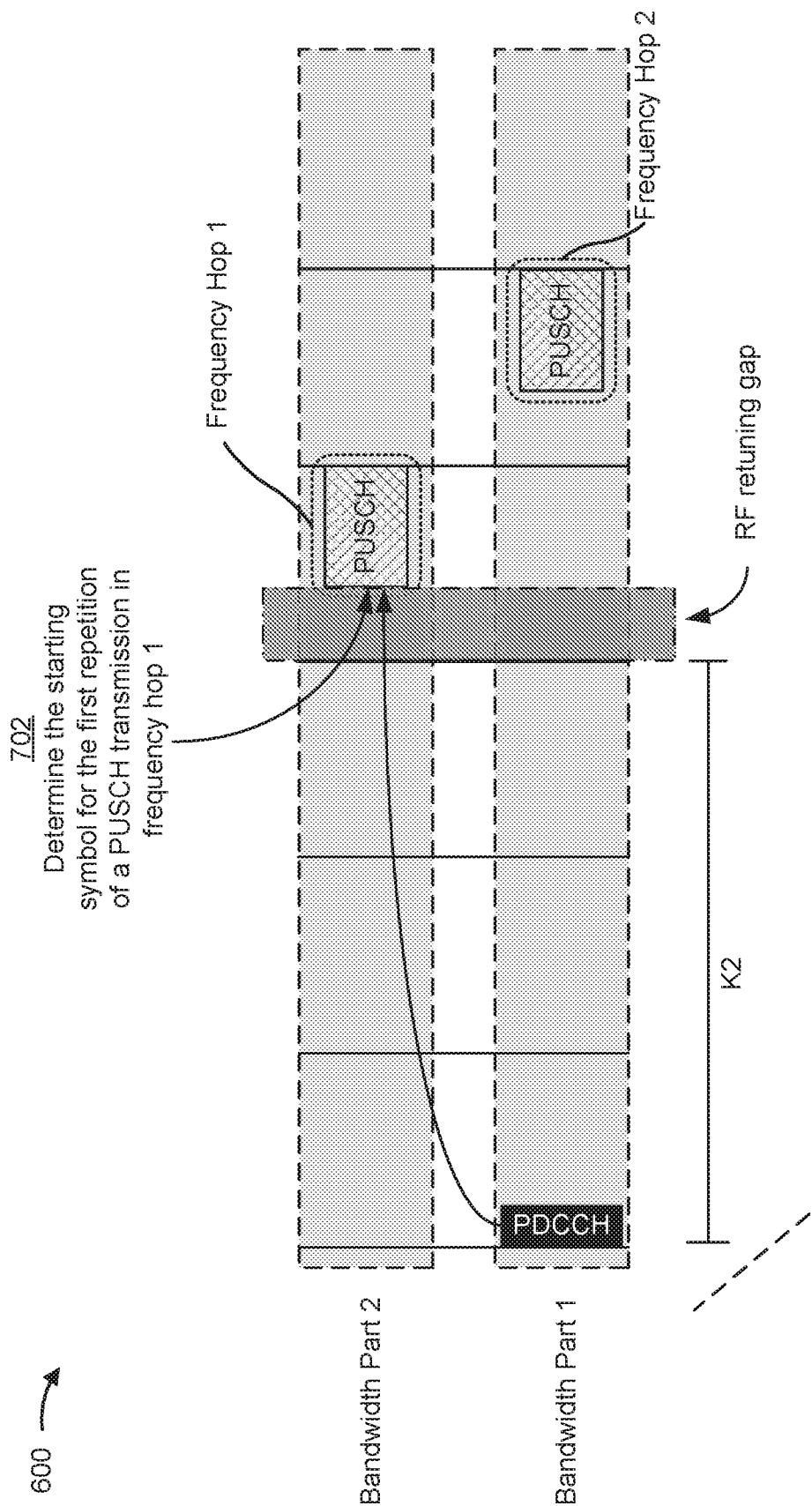
Figure 7B:
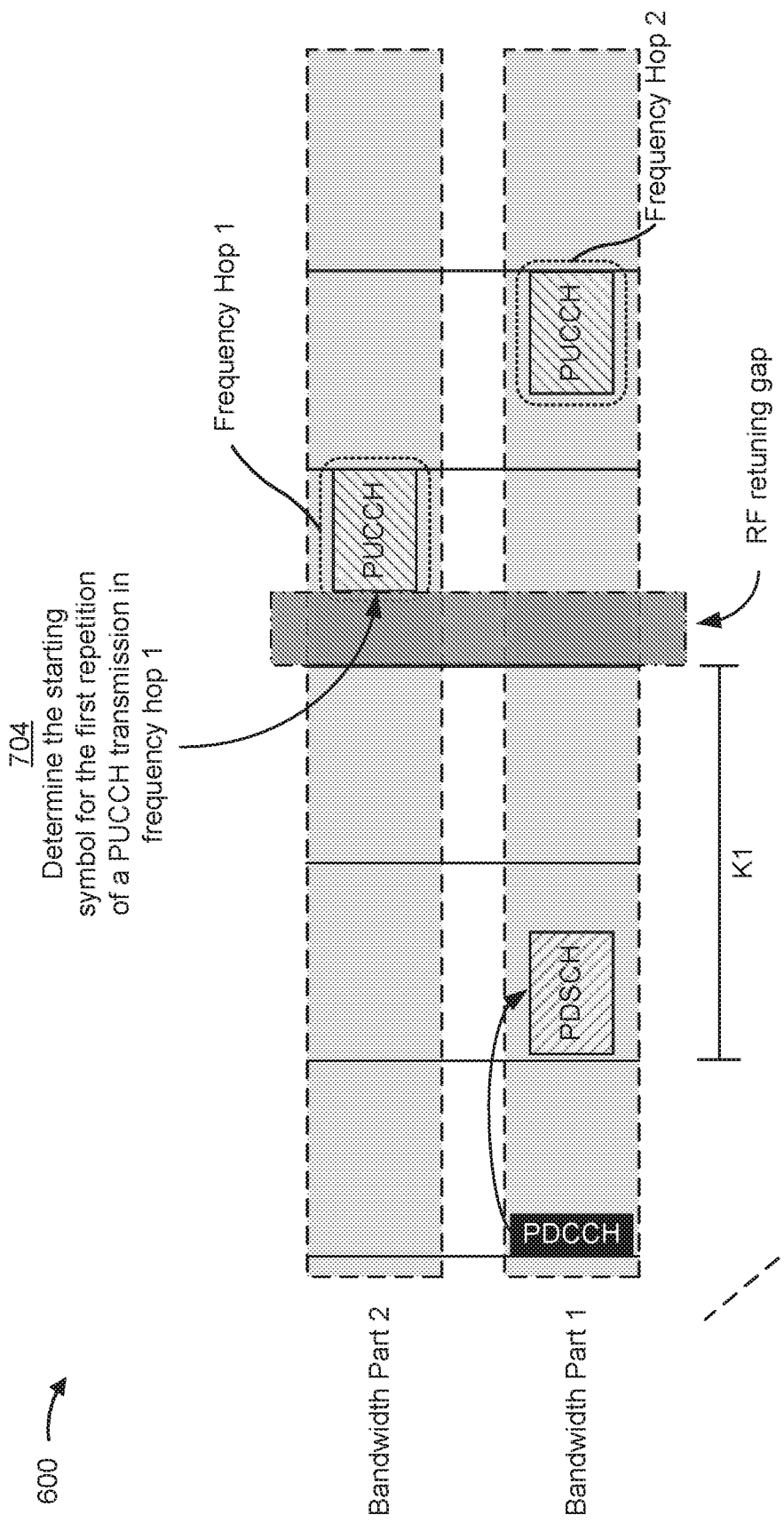

FIGS. 7A and 7B are diagrams illustrating one or more examples 700 of determining an RF retuning gap for cross-BWP uplink frequency hopping, in accordance with various aspects of the present disclosure. As shown in FIGS. 7A and 7B, example(s) 700 may include a UE (e.g., a UE 120). In some aspects, the UE may be included in a wireless network such as wireless network 100. In some aspects, the UE may communicate with a BS (e.g., a BS 110) in the wireless network via a wireless access link. The wireless access link may include an uplink and a downlink. The UE may perform uplink transmissions on the uplink and may receive downlink transmissions on the downlink.

In some aspects, the wireless network may be a 5G NR wireless network or another type of wireless network that supports partitioning, segmenting, or otherwise dividing the bandwidth of the wireless access link into BWPs. In this case, the UE may be configured with one or more BWPs for the uplink and/or one or more BWPs for the downlink. As shown in FIGS. 7A and 7B, in some aspects, the UE may be configured with a plurality of BWPs for the uplink, such as bandwidth part 1 (BWP 1) and bandwidth part 2 (BWP 2). In the example(s) 700 illustrated in FIGS. 7A and 7B, BWP 1 may be referred to as the active uplink BWP for the UE, and BWP 2 may be referred to as an inactive uplink BWP, a supplemental uplink BWP, or another uplink BWP.

In some aspects, the UE may be capable of performing uplink frequency hopping across BWP 1 and BWP 2. For example, the UE may be capable of transmitting one or more first repetitions of a PUSCH transmission in a first frequency hop (frequency hop 1) and one or more second repetitions of the PUSCH transmission in a second frequency hop (frequency hop 2). As another example, the UE may be capable of transmitting one or more first repetitions of a PUCCH transmission in a first frequency hop (frequency hop 1) and one or more second repetitions of the PUCCH transmission in a second frequency hop (frequency hop 2). In this case, the UE may transmit one repetition per slot, may transmit multiple repetitions per slot, may transmit a portion of a repetition in a slot, may transmit a repetition across a plurality of slots, and/or the like.

In some aspects, the UE may be configured (e.g., via signaling from a BS, via hardware and/or software configuration, and/or the like) to perform various uplink frequency hopping patterns. For example, FIGS. 7A and 7B illustrate example uplink frequency hopping patterns in which the UE is configured to transmit the one or more first repetitions of frequency hop 1 in BWP 2 (e.g., outside of the active uplink BWP of the UE and in an inactive or supplemental uplink BWP of the UE) and to subsequently transmit the one or more second repetitions of frequency hop 2 in BWP 1 (e.g., the active uplink BWP of the UE).

Moreover, the UE may be capable of performing RF retuning prior to frequency hop 1 using one or more techniques described above in connection with FIGS. 5A and 5B. Accordingly, the UE may be capable of retuning one or more RF components of the UE (e.g., one or more antennas 252, one or more MODs 254, one or more Tx MIMO processors 266, one or more transmit processors 264, one or more transmit RF chain components, and/or the like) from the frequency of BWP 1 to the frequency of BWP 2, and/or from the frequency of BWP 2 to the frequency of BWP 1. In some aspects, the amount of time that the UE takes to perform RF retuning may be based at least in part on the UE capability of the UE to retune the one or more RF components of the UE.

To accommodate for RF retuning, the UE may determine an RF retuning gap in which the UE is to perform RF retuning. The size or time duration of the RF retuning gap may be configured or determined such that the RF retuning gap is sufficiently long to permit the UE to perform RF retuning during the RF retuning gap. In this case, the size or time duration of the RF retuning gap may be based at least in part on the UE capability of the UE to retune the one or more RF components of the UE.

In some cases, the UE may be capable of determining the starting symbol for the one or more first repetitions of frequency hop 1 (e.g., the starting symbol of the first repetition (repetition 1) of the one or more first repetitions) using various techniques that accommodate for the RF retuning gap prior to the first frequency hop, that accommodate for various UE processing capabilities of the UE, and/or the like.

As shown in FIG. 7A, and by reference number 702, in some aspects, the UE may determine a starting symbol for the first repetition of a PUSCH transmission in frequency hop 1. In some aspects, the UE may determine the starting symbol for the first repetition of the PUSCH transmission in frequency hop 1 to satisfy $N_2+N_{retuning}$ (or the maximum permitted values for $N_2$ and $N_{retuning}$), where $N_{retuning}$ is the quantity of symbols included in the RF retuning gap and $N_2$ is a PUSCH preparation time capability of the UE (in symbols). In this case, the UE determines the starting symbol for the first repetition of the PUSCH transmission in frequency hop 1 such that the starting symbol occurs at least $N_2+N_{retuning}$ symbols after an ending symbol of a physical downlink control channel (PDCCH) transmission carrying downlink control information (DCI) scheduling the PUSCH transmission. In this way, the UE is provided a sufficient amount of time to prepare the PUSCH transmission prior to performing RF retuning in the RF retuning gap.

In some aspects, if the PUSCH transmission is to carry a CSI report, the UE may determine the starting symbol for the first repetition of the PUSCH transmission in frequency hop 1 to satisfy $Z+N_{retuning}$ (or the maximum permitted values for Z and $N_{retuning}$), where Z is a CSI report preparation time capability of the UE (in symbols). In this case, the UE determines the starting symbol for the first repetition of the PUSCH transmission in frequency hop 1 such that the starting symbol occurs at least $Z+N_{retuning}$ symbols after an ending symbol of a PDCCH transmission carrying DCI that triggers (e.g., periodically or semi-persistently) the CSI report, and such that the starting symbol occurs at least $Z+N_{retuning}$ symbols after an ending symbol of the associated CSI measurement resource (e.g., CSI reference signal (CSI-RS), CSI interference measurement (CSI-IM), and/or the like). In this way, the UE is provided a sufficient amount of time to prepare the CSI report prior to performing RF retuning in the RF retuning gap.

In some aspects, if the starting time of the PUSCH transmission is specified by a slot, the UE may determine the starting symbol for the first repetition of the PUSCH transmission in frequency hop 1 based at least in part on a slot offset (e.g., K2 indicated in FIG. 7A) between a slot in which the PDCCH transmission carrying DCI that schedules PUSCH transmission is transmitted and a slot in which a first repetition of the PUSCH transmission in frequency hop 1 is to be transmitted. In this case, the slot offset may be configured (e.g., by a BS or another network entity) to satisfy a threshold quantity of slots (e.g., K2=4 or more slots) that is based at least in part on the quantity of symbols included in the RF retuning gap, the PUSCH processing capability of the UE, and/or other parameters.

In some cases, the PUSCH transmission may be configured with an associated DMRS. The DMRS may be configured or scheduled via a Type A DMRS mapping. In this case, a front-loaded DMRS may be mapped to the second or third symbol of the slot in which the first repetition of the PUSCH transmission is to be transmitted. In this case, if the UE does not have sufficient time between the PDCCH scheduling the PUSCH transmission and the first repetition, or between a CSI measurement resource and the first repetition, the UE may puncture or refrain from transmitting one or more symbols prior to the front-loaded DMRS to ensure that the UE has sufficient time to perform the RF retuning.

As shown in FIG. 7B, and by reference number 704, in some aspects, the UE may determine a starting symbol for the first repetition of a PUCCH transmission in frequency hop 1. In some aspects, the PUCCH transmission may carry HARQ feedback (e.g., an acknowledgement (ACK) or a negative acknowledgement (NACK)) associated with a physical downlink shared channel (PDSCH) transmission scheduled by a PDCCH transmission. In some aspects, the UE may determine the starting symbol for the first repetition of the PUCCH transmission in frequency hop 1 to satisfy $N_1 + N_{retuning}$ (or the maximum permitted values for $N_1$ and $N_{retuning}$), where $N_{retuning}$ is the quantity of symbols included in the RF retuning gap and $N_1$ is a PDSCH processing time capability of the UE (in symbols). In this case, the UE determines the starting symbol for the first repetition of the PUCCH transmission in frequency hop 1 such that the starting symbol occurs at least $N_1 + N_{retuning}$ symbols after an ending symbol of the PDSCH transmission for which the PUCCH transmission is to carry HARQ feedback. In this way, the UE is provided a sufficient amount of time to process the PDSCH transmission and to prepare the HARQ feedback prior to performing RF retuning in the RF retuning gap.

In some aspects, if the starting time of the PUCCH transmission is specified by a slot, the UE may determine the starting symbol for the first repetition of the PUCCH transmission in frequency hop 1 based at least in part on a slot offset (e.g., K1 indicated in FIG. 7B) between a slot in which the PDSCH transmission completes and a slot in which a first repetition of the PUCCH transmission in frequency hop 1 is to be transmitted. In this case, the slot offset may be configured (e.g., by a BS or another network entity) to satisfy a threshold quantity of slots (e.g., K1=3 or more slots) that is based at least in part on the quantity of symbols included in the RF retuning gap, the PDSCH processing capability of the UE, and/or other parameters.

As indicated above, FIGS. 7A and 7B are provided as one or more examples. Other examples may differ from what is described with respect to FIGS. 7A and 7B.

Figure 8:
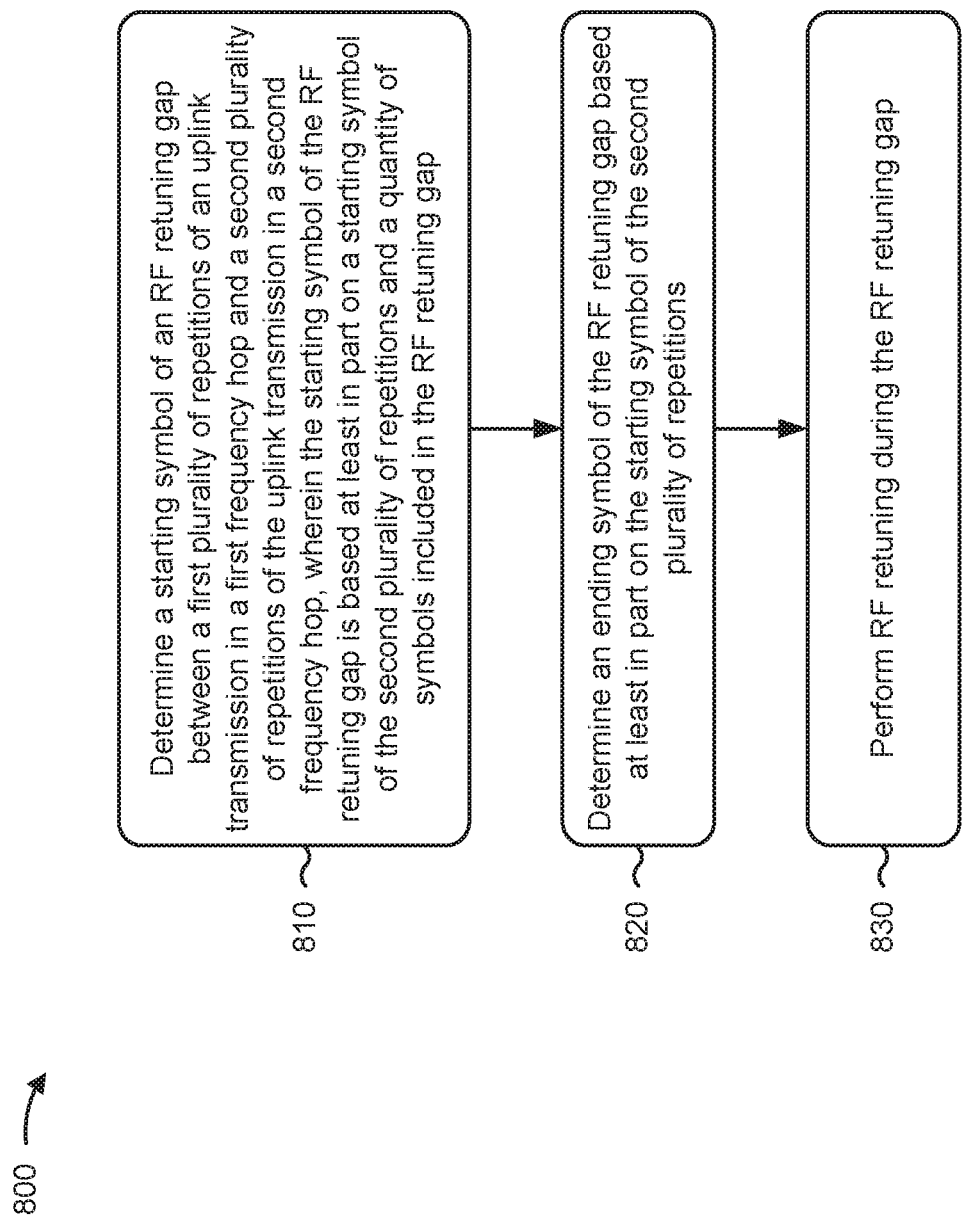
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted and described in connection with FIG. 1 and/or FIG. 2, the UE depicted and described in connection with FIGS. 3A-3E, 4A and 4B, 5A and 5B, 6A and 6B, and/or 7A and 7B, and/or the like) performs operations associated with determining an RF retuning gap for cross-BWP uplink frequency hopping.

As shown in FIG. 8, in some aspects, process 800 may include determining a starting symbol of an RF retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap (block 810). For example, the UE (e.g., using receive processor 258, transmit processor 264, controller/processor 280, memory 282, and/or the like) may determine a starting symbol of an RF retuning gap between a first plurality of repetitions of an uplink transmission in a first frequency hop and a second plurality of repetitions of the uplink transmission in a second frequency hop, as described above. In some aspects, the starting symbol of the RF retuning gap is based at least in part on a starting symbol of the second plurality of repetitions and a quantity of symbols included in the RF retuning gap.

As further shown in FIG. 8, in some aspects, process 800 may include determining an ending symbol of the RF retuning gap based at least in part on the starting symbol of the second plurality of repetitions (block 820). For example, the UE (e.g., using receive processor 258, transmit processor 264, controller/processor 280, memory 282, and/or the like) may determine an ending symbol of the RF retuning gap based at least in part on the starting symbol of the second plurality of repetitions, as described above.

As further shown in FIG. 8, in some aspects, process 800 may include performing RF retuning during the RF retuning gap (block 830). For example, the UE (e.g., using receive processor 258, transmit processor 264, controller/processor 280, memory 282, and/or the like) may perform RF retuning during the RF retuning gap, as described above.

Process 800 may include additional aspects, such as any single aspect or any combination of aspects described below and/or in connection with one or more other processes described elsewhere herein.

In a first aspect, the first frequency hop is configured to be transmitted in an active BWP configured for the UE, the second frequency hop is configured to be transmitted outside the active BWP configured for the UE, and process 800 includes determining a starting symbol of another RF retuning gap at an end of the second frequency hop based at least in part on an ending symbol of the second plurality of repetitions, and determining an ending symbol of the other RF retuning gap based at least in part on the ending symbol of the second plurality of repetitions and a quantity of symbols included in the other RF retuning gap. In a second aspect, alone or in combination with the first aspect, process 800 includes determining that a quantity of symbols between the ending symbol of the second plurality of repetitions and an end of a slot in which the ending symbol of the second plurality of repetitions is included is less than the quantity of the symbols included in the other RF retuning gap, and adjusting the starting symbol of the other RF retuning gap such that the RF retuning gap at least partially overlaps in a time domain with a last repetition of the second plurality of repetitions.

In a third aspect, alone or in combination with one or more of the first and second aspects, the first frequency hop is configured to be transmitted outside an active BWP configured for the UE, the second frequency hop is configured to be transmitted in the active BWP configured for the UE, and process 800 includes determining a starting symbol of another RF retuning gap at a beginning of the first frequency hop based at least in part on a starting symbol of the first plurality of repetitions and a quantity of symbols included in the other RF retuning gap, and determining an ending symbol of the other RF retuning gap based at least in part on the starting symbol of the first plurality of repetitions. In a fourth aspect, alone or in combination with one or more of the first through third aspects, process 800 includes determining the starting symbol of the first plurality of repetitions based at least in part on the quantity of symbols included in the other RF retuning gap and a physical uplink shared channel preparation time relative to an ending symbol of a physical downlink control channel transmission scheduling the uplink transmission, wherein the uplink transmission is a physical uplink shared channel transmission.

In a fifth aspect, alone or in combination with one or more of the first through fourth aspects, process 800 includes determining the starting symbol of the first plurality of repetitions, relative to an ending symbol of a physical downlink control channel transmission scheduling the uplink transmission, based at least in part on the quantity of symbols included in the other RF retuning gap and a CSI report preparation time relative to an ending symbol of a CSI measurement resource, wherein the uplink transmission is a physical uplink shared channel transmission. In a sixth aspect, alone or in combination with one or more of the first through fifth aspects, process 800 includes determining the starting symbol of the first plurality of repetitions based at least in part on a slot offset between a slot in which a physical uplink control channel transmission scheduling the uplink transmission is transmitted and a slot in which a first repetition of the first plurality of repetitions is to be transmitted, wherein the slot offset satisfies a threshold quantity of slots that is based at least in part on the quantity of symbols included in the other RF retuning gap.

In a seventh aspect, alone or in combination with one or more of the first through sixth aspects, process 800 includes determining the starting symbol of the first plurality of repetitions such that the first plurality of repetitions punctures one or more symbols before a first demodulation reference signal symbol associated with the uplink transmission. In an eighth aspect, alone or in combination with one or more of the first through seventh aspects, the uplink transmission is a physical uplink control channel transmission that is to include hybrid automatic repeat request feedback associated with a PDSCH transmission, and process 800 includes determining the starting symbol of the first plurality of repetitions based at least in part on the quantity of symbols included in the other RF retuning gap and a PDSCH processing time relative to an ending symbol of the PDSCH transmission.

In a ninth aspect, alone or in combination with one or more of the first through eighth aspects, the uplink transmission is a physical uplink control channel transmission that is to include hybrid automatic repeat request feedback associated with a PDSCH transmission, and process 800 includes determining the starting symbol of the first plurality of repetitions based at least in part on a slot offset between a slot in which the PDSCH transmission is to be transmitted and a slot in which a first repetition of the first plurality of repetitions is to be transmitted, wherein the slot offset satisfies a threshold quantity of slots that is based at least in part on the quantity of symbols included in the other RF retuning gap. In a tenth aspect, alone or in combination with one or more of the first through ninth aspects, process 800 includes determining, based at least in part on the starting symbol of the RF retuning gap, that the RF retuning gap at least partially overlaps in a time domain with one or more symbols of a repetition in the first plurality of repetitions, and refraining from transmitting the one or more symbols of the repetition based at least in part on determining that the RF retuning gap at least partially overlaps in the time domain with the one or more symbols of the repetition.

In an eleventh aspect, alone or in combination with one or more of the first through tenth aspects, refraining from transmitting the one or more symbols of the repetition comprises refraining from transmitting the one or more symbols of the repetition based at least in part on determining that the one or more symbols are not configured for transmission of a demodulation reference signal. In a twelfth aspect, alone or in combination with one or more of the first through eleventh aspects, process 800 includes determining, based at least in part on the starting symbol of the RF retuning gap, that the RF retuning gap at least partially overlaps in a time domain with one or more symbols of a repetition in the first plurality of repetitions, determining that at least a subset of the one or more symbols of the repetition are configured for transmission of a demodulation reference signal, and adjusting the starting symbol of the RF retuning gap and the ending symbol of the RF retuning gap such that the RF retuning gap does not overlap the at least the subset of the one or more symbols of the repetition.

In a thirteenth aspect, alone or in combination with one or more of the first through twelfth aspects, adjusting the starting symbol of the RF retuning gap and the ending symbol of the RF retuning gap comprises moving the starting symbol of the RF retuning gap forward in time by a quantity of symbols such that the RF retuning gap does not overlap the at least the subset of the one or more symbols of the repetition, and moving the ending symbol of the RF retuning gap forward in time by the quantity of symbols such that the RF retuning gap at least partially overlaps in the time domain with one or more symbols of a repetition in the second plurality of repetitions. In a fourteenth aspect, alone or in combination with one or more of the first through thirteenth aspects, the uplink transmission is a PUSCH transmission, and process 800 includes determining that the RF retuning gap at least partially overlaps with a single-slot PUCCH transmission, and multiplexing uplink control information of the single-slot PUCCH transmission into a repetition of the plurality of second repetitions, wherein the single-slot PUCCH transmission and the repetition are included in a same slot.

In a fifteenth aspect, alone or in combination with one or more of the first through fourteenth aspects, the uplink transmission is a first PUCCH transmission, and process 800 includes determining that the RF retuning gap at least partially overlaps with a second PUCCH transmission and transmitting, based at least in part on determining that the RF retuning gap at least partially overlaps with the second PUCCH transmission, the second PUCCH transmission or a repetition of the second plurality of repetitions, based at least in part on a priority associated with the second PUCCH transmission and a priority associated with the repetition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a starting symbol of a radio frequency (RF) retuning gap between a first plurality of repetitions of an uplink transmission in a first frequency hop and a second plurality of repetitions of the uplink transmission in a second frequency hop,
      wherein the starting symbol of the RF retuning gap is based at least in part on a starting symbol of the second plurality of repetitions and a quantity of symbols included in the RF retuning gap;
   determining an ending symbol of the RF retuning gap based at least in part on the starting symbol of the second plurality of repetitions; and
   performing RF retuning during the RF retuning gap.

2. The method of claim 1, wherein the first frequency hop is configured to be transmitted in an active bandwidth part (BWP) configured for the UE;
   wherein the second frequency hop is configured to be transmitted outside the active BWP configured for the UE; and
   wherein the method further comprises:
      determining a starting symbol of another RF retuning gap at an end of the second frequency hop based at least in part on an ending symbol of the second plurality of repetitions; and
      determining an ending symbol of the other RF retuning gap based at least in part on the ending symbol of the second plurality of repetitions and a quantity of symbols included in the other RF retuning gap.

3. The method of claim 2, further comprising:
   determining that a quantity of symbols between the ending symbol of the second plurality of repetitions and an end of a slot in which the ending symbol of the second plurality of repetitions is included is less than the quantity of the symbols included in the other RF retuning gap; and
   adjusting the starting symbol of the other RF retuning gap such that the RF retuning gap at least partially overlaps in a time domain with a last repetition of the second plurality of repetitions.

4. The method of claim 1, wherein the first frequency hop is configured to be transmitted outside an active bandwidth part (BWP) configured for the UE;
   wherein the second frequency hop is configured to be transmitted in the active BWP configured for the UE; and
   wherein the method further comprises:
      determining a starting symbol of another RF retuning gap at a beginning of the first frequency hop based at least in part on a starting symbol of the first plurality of repetitions and a quantity of symbols included in the other RF retuning gap; and
      determining an ending symbol of the other RF retuning gap based at least in part on the starting symbol of the first plurality of repetitions.

5. The method of claim 4, further comprising:
   determining the starting symbol of the first plurality of repetitions based at least in part on the quantity of symbols included in the other RF retuning gap and a physical uplink shared channel preparation time relative to an ending symbol of a physical downlink control channel transmission scheduling the uplink transmission,
      wherein the uplink transmission is a physical uplink shared channel transmission.

6. The method of claim 4, further comprising:
   determining the starting symbol of the first plurality of repetitions, relative to an ending symbol of a physical downlink control channel transmission scheduling the uplink transmission, based at least in part on the quantity of symbols included in the other RF retuning gap and a channel state information (CSI) report preparation time relative to an ending symbol of a CSI measurement resource,
      wherein the uplink transmission is a physical uplink shared channel transmission.

7. The method of claim 4, further comprising:
   determining the starting symbol of the first plurality of repetitions based at least in part on a slot offset between a slot in which a physical uplink control channel transmission scheduling the uplink transmission is transmitted and a slot in which a first repetition of the first plurality of repetitions is to be transmitted,
      wherein the slot offset satisfies a threshold quantity of slots that is based at least in part on the quantity of symbols included in the other RF retuning gap.

8. The method of claim 4, further comprising:
   determining the starting symbol of the first plurality of repetitions such that the first plurality of repetitions punctures one or more symbols before a first demodulation reference signal symbol associated with the uplink transmission.

9. The method of claim 4, wherein the uplink transmission is a physical uplink control channel transmission that is to include hybrid automatic repeat request feedback associated with a physical downlink shared channel (PDSCH) transmission; and wherein the method further comprises:
  determining the starting symbol of the first plurality of repetitions based at least in part on the quantity of symbols included in the other RF retuning gap and a PDSCH processing time relative to an ending symbol of the PDSCH transmission.

10. The method of claim 4, wherein the uplink transmission is a physical uplink control channel transmission that is to include hybrid automatic repeat request feedback associated with a physical downlink shared channel (PDSCH) transmission; and
  wherein the method further comprises:
    determining the starting symbol of the first plurality of repetitions based at least in part on a slot offset between a slot in which the PDSCH transmission is to be transmitted and a slot in which a first repetition of the first plurality of repetitions is to be transmitted, wherein the slot offset satisfies a threshold quantity of slots that is based at least in part on the quantity of symbols included in the other RF retuning gap.

11. The method of claim 1, further comprising:
  determining, based at least in part on the starting symbol of the RF retuning gap, that the RF retuning gap at least partially overlaps in a time domain with one or more symbols of a repetition in the first plurality of repetitions; and
  refraining from transmitting the one or more symbols of the repetition based at least in part on determining that the RF retuning gap at least partially overlaps in the time domain with the one or more symbols of the repetition.

12. The method of claim 11, wherein refraining from transmitting the one or more symbols of the repetition comprises:
  refraining from transmitting the one or more symbols of the repetition based at least in part on determining that the one or more symbols are not configured for transmission of a demodulation reference signal.

13. The method of claim 1, further comprising:
  determining, based at least in part on the starting symbol of the RF retuning gap, that the RF retuning gap at least partially overlaps in a time domain with one or more symbols of a repetition in the first plurality of repetitions;
  determining that at least a subset of the one or more symbols of the repetition are configured for transmission of a demodulation reference signal; and
  adjusting the starting symbol of the RF retuning gap and the ending symbol of the RF retuning gap such that the RF retuning gap does not overlap the at least the subset of the one or more symbols of the repetition.

14. The method of claim 13, wherein adjusting the starting symbol of the RF retuning gap and the ending symbol of the RF retuning gap comprises:
  moving the starting symbol of the RF retuning gap forward in time by a quantity of symbols such that the RF retuning gap does not overlap the at least the subset of the one or more symbols of the repetition; and
  moving the ending symbol of the RF retuning gap forward in time by the quantity of symbols such that the RF retuning gap at least partially overlaps in the time domain with one or more symbols of a repetition in the second plurality of repetitions.

15. The method of claim 1, wherein the uplink transmission is a physical uplink shared channel (PUSCH) transmission; and the method further comprises:
  determining that the RF retuning gap at least partially overlaps with a single-slot physical uplink control channel (PUCCH) transmission; and
  multiplexing uplink control information of the single-slot PUCCH transmission into a repetition of the plurality of second repetitions,
    wherein the single-slot PUCCH transmission and the repetition are included in a same slot.

16. The method of claim 1, wherein the uplink transmission is a first physical uplink control channel (PUCCH) transmission; and
  the method further comprises:
    determining that the RF retuning gap at least partially overlaps with a second PUCCH transmission; and
    transmitting, based at least in part on determining that the RF retuning gap at least partially overlaps with the second PUCCH transmission, the second PUCCH transmission or a repetition of the second plurality of repetitions, based at least in part on a priority associated with the second PUCCH transmission and a priority associated with the repetition.

17. A user equipment (UE) for wireless communication, comprising:
  one or more memories; and
  one or more processors coupled to the one or more memories, the one or more memories storing instructions configurable to be executed by the one or more processors to cause the UE to:
    determine a starting symbol of a radio frequency (RF) retuning gap between a first plurality of repetitions of an uplink transmission in a first frequency hop and a second plurality of repetitions of the uplink transmission in a second frequency hop,
      wherein the starting symbol of the RF retuning gap is based at least in part on a starting symbol of the second plurality of repetitions and a quantity of symbols included in the RF retuning gap;
    determine an ending symbol of the RF retuning gap based at least in part on the starting symbol of the second plurality of repetitions; and
    perform RF retuning during the RF retuning gap.

18. A non-transitory computer-readable medium storing one or more instructions for wireless communication, the one or more instructions comprising:
  one or more instructions that, when executed by one or more processors of a user equipment (UE), cause the UE to:
    determine a starting symbol of a radio frequency (RF) retuning gap between a first plurality of repetitions of an uplink transmission in a first frequency hop and a second plurality of repetitions of the uplink transmission in a second frequency hop,
      wherein the starting symbol of the RF retuning gap is based at least in part on a starting symbol of the second plurality of repetitions and a quantity of symbols included in the RF retuning gap;
    determine an ending symbol of the RF retuning gap based at least in part on the starting symbol of the second plurality of repetitions; and
    perform RF retuning during the RF retuning gap.

19. An apparatus for wireless communication, comprising:
  means for determining a starting symbol of a radio frequency (RF) retuning gap between a first plurality of repetitions of an uplink transmission in a first frequency hop and a second plurality of repetitions of the uplink transmission in a second frequency hop, wherein the starting symbol of the RF retuning gap is based at least in part on a starting symbol of the second plurality of repetitions and a quantity of symbols included in the RF retuning gap;

means for determining an ending symbol of the RF retuning gap based at least in part on the starting symbol of the second plurality of repetitions; and means for performing RF retuning during the RF retuning gap.

* * * * *